United States Patent
Seki et al.

(10) Patent No.: US 10,944,895 B2
(45) Date of Patent: Mar. 9, 2021

(54) ACCESSORY APPARATUS, IMAGE-CAPTURING APPARATUS, CONTROL APPARATUS, LENS APPARATUS, CONTROL METHOD, COMPUTER PROGRAM AND STORAGE MEDIUM STORING COMPUTER PROGRAM

(71) Applicant: CANON KABUSHIKI KAISHA, Tokyo (JP)

(72) Inventors: Hironori Seki, Sagamihara (JP); Atsushi Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/207,292

(22) Filed: Dec. 3, 2018

(65) Prior Publication Data

US 2019/0104248 A1 Apr. 4, 2019

Related U.S. Application Data

(62) Division of application No. 15/467,157, filed on Mar. 23, 2017, now Pat. No. 10,187,561.

(30) Foreign Application Priority Data

Mar. 31, 2016 (JP) ................ 2016-069915
Jul. 25, 2016 (JP) ................ 2016-145210

(51) Int. Cl.
*H04N 5/225* (2006.01)
*H04N 5/232* (2006.01)
(Continued)

(52) U.S. Cl.
CPC ....... *H04N 5/23209* (2013.01); *H04N 5/2254* (2013.01); *H04N 5/23254* (2013.01);
(Continued)

(58) Field of Classification Search
CPC ........... H04N 5/23209; H04N 5/23254; H04N 5/23258; H04N 5/23261; H04N 5/23287;
(Continued)

(56) References Cited

U.S. PATENT DOCUMENTS 6,734,902 B1 * 5/2004 Kawahara ................ G03B 5/00
348/208.5
7,593,055 B2 9/2009 Nakamura et al.
(Continued)

FOREIGN PATENT DOCUMENTS

CN 101021667 A 8/2007
CN 102457679 A 5/2012
(Continued)

OTHER PUBLICATIONS

Feb. 21, 2019 Great Britain Official Action in Great Britain Patent Appln. No. 1814163.0.
(Continued)

*Primary Examiner* — Hung H Lam
(74) *Attorney, Agent, or Firm* — Venable LLP

(57) ABSTRACT

The accessory apparatus provides, with an image-capturing apparatus, a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus. An accessory controller acquires from a timer, in response to receiving a transmission request as the notice, a first time of receiving the transmission request and acquires, in response to receiving a specific command through the second data communication channel from the image-capturing apparatus, accessory information corresponding to the first time or a second time (Continued)

acquired based on the first time. The accessory controller transmits the accessory information to the image-capturing apparatus through the first data communication channel.

24 Claims, 17 Drawing Sheets

(51) Int. Cl.
  *H04N 5/38* (2006.01)
  *H04N 101/00* (2006.01)
  *H04N 5/06* (2006.01)

(52) U.S. Cl.
  CPC ..... *H04N 5/23258* (2013.01); *H04N 5/23261* (2013.01); *H04N 5/23287* (2013.01); *H04N 5/06* (2013.01); *H04N 5/38* (2013.01); *H04N 2101/00* (2013.01)

(58) Field of Classification Search
  CPC .... H04N 5/2254; H04N 2101/00; H04N 5/38; H04N 5/06; H04N 5/23203; H04N 5/23251; H04N 5/23264
  See application file for complete search history.

(56) References Cited

U.S. PATENT DOCUMENTS

| | | | |
|---|---|---|---|
| 7,653,293 | B2 | 1/2010 | Masuda |
| 8,395,697 | B2 | 3/2013 | Shikaumi |
| 8,542,989 | B2* | 9/2013 | Shibuno ................ G03B 17/14 396/133 |
| 8,941,774 | B2 | 1/2015 | Kudo et al. |
| 9,310,665 | B2 | 4/2016 | Kawanishi |
| 9,591,200 | B2 | 3/2017 | Kudo et al. |
| 2006/0268158 | A1 | 11/2006 | Ishiyama et al. |
| 2007/0189745 | A1 | 8/2007 | Masuda |
| 2009/0135293 | A1 | 5/2009 | Shikaumi |
| 2011/0292238 | A1 | 12/2011 | Katsumata |
| 2011/0317990 | A1* | 12/2011 | Imafuji ................ G03B 17/14 396/133 |
| 2012/0105711 | A1 | 5/2012 | Kudo et al. |
| 2012/0148229 | A1 | 6/2012 | Tamura |
| 2013/0011130 | A1 | 1/2013 | Kamimura |
| 2013/0182171 | A1 | 7/2013 | Kawanishi |
| 2014/0132781 | A1* | 5/2014 | Adams ................ H04N 5/2254 348/207.1 |
| 2014/0313313 | A1 | 10/2014 | Soenksen |
| 2014/0368725 | A1 | 12/2014 | Brunner et al. |
| 2015/0109471 | A1 | 4/2015 | Kudo et al. |
| 2016/0301858 | A1 | 10/2016 | Aoyama |
| 2017/0280060 | A1* | 9/2017 | Sugita ................ H04N 5/04 |

FOREIGN PATENT DOCUMENTS

| | | |
|---|---|---|
| CN | 103209295 A | 7/2013 |
| EP | 0 352 778 A2 | 1/1990 |
| EP | 3438738 A1 | 2/2019 |
| JP | 2006-317848 A | 11/2006 |
| JP | 2009-128785 A | 6/2009 |
| JP | 2012-108474 A | 6/2012 |
| JP | 5247859 B2 | 7/2013 |
| JP | 2014-126859 A | 7/2014 |
| JP | 2015-145901 A | 8/2015 |
| JP | 2015-161730 A | 9/2015 |
| JP | 2015-185925 A | 10/2015 |

OTHER PUBLICATIONS

May 21, 2020 Great Britain Search Report and Examination Report in Great Britain Patent Appln. No. 1814163.0.
Sep. 11, 2017 Great Britain Search and Examination Report in Great Britain Patent Appln. No. 1704919.8.
Jun. 23, 2020 Japanese Official Action in Japanese Patent Appln. No. 2016-145210.
Aug. 30, 2019 Chinese Official Action in Chinese Patent Appln. No. 201710219158.1.

* cited by examiner

ACCESSORY APPARATUS, IMAGE-CAPTURING APPARATUS, CONTROL APPARATUS, LENS APPARATUS, CONTROL METHOD, COMPUTER PROGRAM AND STORAGE MEDIUM STORING COMPUTER PROGRAM

This application is a division of application Ser. No. 15/467,157 filed Mar. 23, 2017.

BACKGROUND OF THE INVENTION

Field of the Invention

The present invention relates to an image-capturing apparatus (hereinafter referred to as "a camera body") and an accessory apparatus such as an interchangeable lens, which are communicable with each other. The present invention further relates to an image-capturing apparatus performing a follow shot assist process.

Description of the Related Art

In an accessory-interchangeable camera system including a camera body to which an accessory apparatus is detachably attachable, the camera body and the accessory apparatus communicate with each other for controlling the accessory apparatus from the camera body and for providing, from the accessory apparatus to the camera body, data required for controlling the accessory apparatus. In particular, when an interchangeable lens is used for capturing a moving image to be recorded, or a live-view moving image to be displayed, smooth lens control in synchronization with image-capturing periods is required, so that it is necessary to synchronize image-capturing times in the camera body with control times in the interchangeable lens. Thus, the camera body is required to complete receipt of the data from the interchangeable lens, and transmission of various commands and requests to the interchangeable lens in one image-capturing period.

However, an increase of an amount of the data to be received by the camera body from the interchangeable lens and a reduction of the image-capturing period (that is, an increase of a frame rate) require a large data amount communication in a shorter time.

On the other hand, a camera system is provided that performs, when a user performs a follow shot of a moving object, a follow shot assist process by moving an image-stabilizing lens depending on an angular velocity detected by a gyro sensor included in an interchangeable lens, and on a movement amount of an object image on an image sensor included in a camera body. In order to perform a good follow shot assist process, it is necessary to accurately synchronize a time point at which the camera body calculates the movement amount of the object on the image sensor with a time point at which the interchangeable lens detects the angular velocity.

Japanese Patent No. 5247859 discloses a camera system that notices a time point of a vertical synchronization signal to an interchangeable lens by keeping a signal level of a communication terminal at a predetermined level for a predetermined time period or more, and then changing the signal level of the communication terminal in synchronization with the vertical synchronization signal.

However, in the camera system disclosed in Japanese Patent No. 5247859, in a case of requiring a large data amount communication in a short time, it is difficult to acquire the predetermined time period for which the signal level of the communication terminal is kept at the predetermined level. Furthermore, there is a case where another communication for transmitting, for example, a focus drive command to the interchangeable lens inhibits a well-timed control of the signal level.

In addition, Japanese Patent Laid-Open No. 2006-317848 discloses a method of enabling a good follow shot by detecting a difference between a moving velocity of an object and a panning speed of a lens-integrated camera, and by correcting the difference using an image-stabilizing function. Japanese Patent Laid-Open No. 2015-161730 discloses a method of improving a detection accuracy of a moving speed of an object by changing an output time point of a shake detector, that is, a detection time point of an angular velocity depending on an exposure time period and a frame rate to match the detection time point of the angular velocity with a detection time point of a motion vector of the object (object image).

However, the methods disclosed in Japanese Patent Laid-Open Nos. 2006-317848 and 2015-161730 are used not for lens-interchangeable camera systems, but only for lens-integrated cameras. In order to improve a performance of the follow shot assist process in the lens-interchangeable camera system, it is necessary to properly manage the detection time point of the motion vector or the moving velocity of the object and that of the angular velocity.

SUMMARY OF THE INVENTION

The present invention provides an accessory apparatus and an image-capturing apparatus capable of performing calculation, control and other processes in a lens-interchangeable image-capturing system by using data accurately synchronized with each other between the accessory apparatus and the image-capturing apparatus. The present invention further provides a control apparatus and others capable of improving a performance of a follow shot assist process.

The present invention provides as an aspect thereof an accessory apparatus detachably attachable to an image-capturing apparatus. The accessory apparatus includes an accessory communicator configured to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus. The accessory apparatus further includes an accessory controller configured to perform the data communication with the image-capturing apparatus through the accessory communicator and configured to acquire accessory information changing with time, and a timer configured to count time. The accessory controller is configured to acquire from the timer, in response to receiving a transmission request as the notice from the image-capturing apparatus through the notification channel, a first time of receiving the transmission request, acquire, in response to receiving a specific command through the second data communication channel from the image-capturing apparatus, the accessory information corresponding to the first time or a second time acquired based on the first time, and transmit the accessory information to the image-capturing apparatus through the first data communication channel.

The present invention provides as another aspect thereof an image-capturing apparatus to which an accessory apparatus is detachably attachable. The image-capturing apparatus includes a camera communicator configured to provide, with the accessory apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus. The image-capturing apparatus further includes and a camera controller configured to perform data communication with the accessory apparatus through the camera communicator. The camera controller is configured to provide a transmission request as the notice to the accessory apparatus through the notification channel, transmit, to the accessory apparatus through the first data communication channel, a specific command for causing the accessory apparatus to acquire accessory information corresponding to a first time of receiving the transmission request or corresponding to a second time acquired based on the first time, the accessory information changing with time, and receive the accessory information corresponding to the first or second time from the accessory apparatus through the second data communication channel.

The present invention provides as yet another aspect thereof an image-capturing system including the above accessory and image-capturing apparatuses.

The present invention provides as still another aspect thereof a control method of controlling an accessory apparatus detachably attachable to an image-capturing apparatus and configured to provide, with the image-capturing apparatus, three channels that are a notification channel used for providing a notice from the image-capturing apparatus to the accessory apparatus, a first data communication channel used for data transmission from the accessory apparatus to the image-capturing apparatus, and a second data communication channel used for data transmission from the image-capturing apparatus to the accessory apparatus. The control method includes the step of causing the accessory apparatus to acquire, in response to receiving a transmission request as the notice from the image-capturing apparatus through the notification channel, a first time of receiving the transmission request, the step of causing the accessory apparatus to acquire, in response to receiving a specific command through the second data communication channel, the accessory information corresponding to the first time or a second time acquired based on the first time, and the step of causing the accessory apparatus to transmit the accessory information to the image-capturing apparatus through the first data communication channel.

The present invention provides as yet still another aspect thereof a control method of controlling an image-capturing apparatus to which an accessory apparatus is detachably attachable and that is configured to provide, with the accessory apparatus, three channels that are a notification channel used for providing a notice from the image-capturing apparatus to the accessory apparatus, a first data communication channel used for data transmission from the accessory apparatus to the image-capturing apparatus and a second data communication channel used for data transmission from the image-capturing apparatus to the accessory apparatus. The control method includes the step of causing the image-capturing apparatus to provide a transmission request as the notice to the accessory apparatus through the notification channel, the step of causing the image-capturing apparatus to transmit, to the accessory apparatus through the first data communication channel, a specific command for causing the accessory apparatus to acquire accessory information corresponding to a first time of receiving the transmission request or corresponding to a second time acquired based on the first time, the accessory information changing with time, and the step of causing the image-capturing apparatus to receive the accessory information corresponding to the first or second time from the accessory apparatus through the second data communication channel.

The present invention provides as further another aspect thereof a control apparatus (image-capturing apparatus) including a motion vector detector configured to detect a motion vector in a first time period, a calculator configured to set, depending on the first time period, an angular velocity detection time period in which a first angular velocity is detected by an angular velocity detector, and a communicator configured to transmit the angular velocity detection time period and first ID information corresponding to the first time period in relation to each other, and receive the first angular velocity detected in the angular velocity detection time period and second ID information corresponding to the first angular velocity in relation to each other. The calculator is configured to calculate an angular velocity of an object, when the first ID information and the second ID information are identical to each other, by using the motion vector detected in the first time period corresponding to the first ID information and the first angular velocity corresponding to the second ID information.

The present invention provides as yet another aspect thereof a control apparatus (lens apparatus) including a communicator configured to receive an angular velocity detection time period in which a first angular velocity is detected and first ID information in relation to each other, the first ID information corresponding to a first time period that is a motion vector detection time period in which a motion vector is detected, the angular velocity detection time period being set depending on the first time period, and an angular velocity detector configured to detect the first angular velocity in the angular velocity detection time period. The communicator is configured to transmit the first angular velocity and second ID information corresponding to the first angular velocity in relation to each other when the first ID information and the second ID information are identical to each other.

The present invention provides as still another aspect thereof a control method including the step of detecting a motion vector in a first time period, the step of setting, depending on the first time period, an angular velocity detection time period in which a first angular velocity is detected by an angular velocity detector, the step of transmitting the angular velocity detection time period and first ID information corresponding to the first time period in relation to each other, the step of receiving the first angular velocity detected in the angular velocity detection time period and second ID information corresponding to the first angular velocity in relation to each other; and the step of calculating an angular velocity of an object, when the first ID information and the second ID information are identical to each other, by using the motion vector detected in the first time period corresponding to the first ID information and the first angular velocity corresponding to the second ID information.

The present invention provides as yet still another aspect thereof a control method including the step of receiving an angular velocity detection time period in which a first angular velocity is detected and first ID information in relation to each other, the first ID information corresponding to a first time period that is a motion vector detection time period in which a motion vector is detected, the angular velocity detection time period being set depending on the first time period, the step of detecting the first angular velocity in the angular velocity detection time period, and the step of transmitting the first angular velocity and second ID information corresponding to the first angular velocity in relation to each other when the first ID information and the second ID information are identical to each other.

Further features and aspects of the present invention will become apparent from the following description of exemplary embodiments with reference to the attached drawings.

DESCRIPTION OF THE EMBODIMENTS

Embodiments of the present invention will be described below with reference to the accompanied drawings.

Embodiment 1

Figure 1:
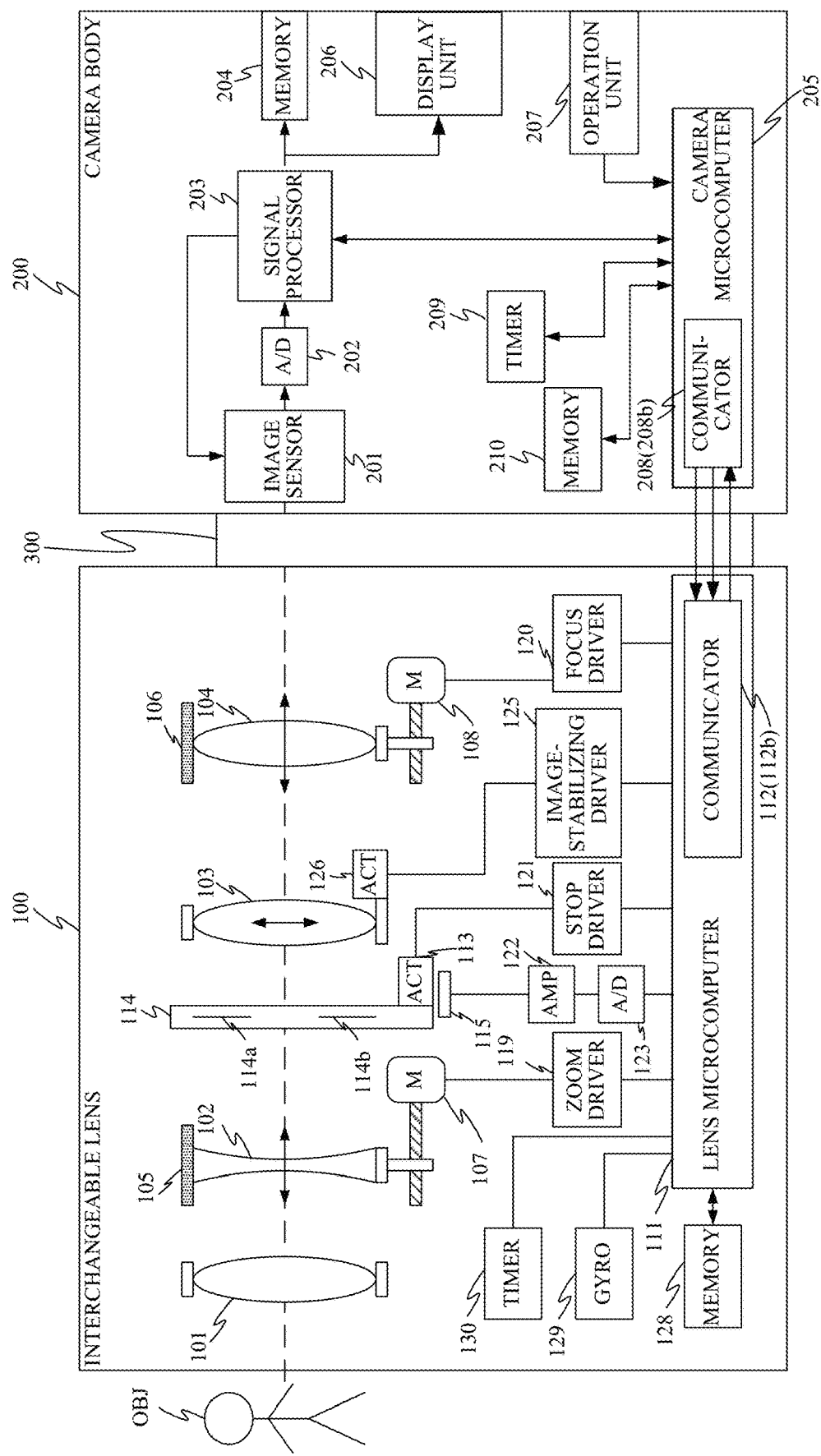
FIG. 1 is a block diagram illustrating a configuration of a camera system according to Embodiments 1 and 2 of the present invention.

FIG. 1 illustrates a configuration of an image-capturing system (hereinafter referred to as "a camera system") including a camera body 200 as an image-capturing apparatus and an interchangeable lens 100 as an accessory apparatus according to a first embodiment (Embodiment 1) of the present invention.

The camera body 200 and the interchangeable lens 100 transmit control commands and internal information to each other via their communicators described later.

The communicators are compatible with various communication methods and switch their communication formats to the same one in synchronization with each other depending on types of data to be communicated and the purposes of their communication. This enables selecting an optimum communication format for each of various situations. First, description will be made of specific configurations of the interchangeable lens 100 and the camera body 200. The interchangeable lens 100 and the camera body 200 are mechanically and electrically connected with each other via a mount 300 including a coupling mechanism. The interchangeable lens 100 receives power supply from the camera body 200 via a power source terminal (not illustrated) provided in the mount 300 and supplies, to various actuators and a lens microcomputer described later, power sources necessary for their operations. The interchangeable lens 100 and the camera body 200 communicate with each other via communication terminals (illustrated in FIG. 2) provided in the mount 300.

The interchangeable lens 100 includes an image-capturing optical system. The image-capturing optical system includes, from an object (OBJ) side, a field lens 101, a magnification-varying lens 102 for variation of magnification, a stop unit (aperture) 114 for light amount control, an image-stabilizing lens 103 for image blur correction and a focus lens 104 for focusing.

The magnification-varying lens 102 and the focus lens 104 are respectively held by lens holders 105 and 106. The lens holders 105 and 106 are guided by guide bars (not illustrated) movably in an optical axis direction in which an optical axis (illustrated by a broken line) of the image-capturing optical system extends and are driven in the optical axis direction respectively by stepping motors 107 and 108. The stepping motors 107 and 108 rotate in synchronization with drive pulses and respectively move the magnification-varying lens 102 and the focus lens 104.

The image-stabilizing lens 103 is moved in a direction orthogonal to the optical axis of the image-capturing optical system to reduce image blur caused by user's hand jiggling or the like.

The lens microcomputer 111 as an accessory controller controls various operations in the interchangeable lens 100. The lens microcomputer 111 includes a lens communicator 112 and receives, via the lens communicator 112, control commands transmitted from the camera body 200 and transmission requests output therefrom. The lens microcomputer 111 performs various lens controls corresponding to the control commands and transmits lens data corresponding to the transmission requests via the lens communicator 112.

The lens microcomputer 111 performs operations relating to the communication with the camera body 200 (that is, with a camera microcomputer described later) according to a lens communication control program as a computer program.

In addition, the lens microcomputer 111 outputs, in response to a zoom command and a focus drive command among the control commands, a zoom drive signal and a focus drive signal to a zoom driver 119 and a focus driver 120 to cause them to drive the stepping motors 107 and 108, thereby performing a zoom process to control a magnification variation operation by the magnification-varying lens 104 and an AF (autofocus) process to control a focus operation by the focus lens 104.

The interchangeable lens 100 is provided with a manual focus ring (not illustrated) that is rotationally operable by a user and a focus encoder (not illustrated) for detecting a rotational operation amount of the manual focus ring. The lens microcomputer 111 causes the focus driver 120 to drive the stepping motor 108 by a drive amount corresponding to the rotational operation amount of the manual focus ring detected by the focus encoder, thereby performing MF (manual focus).

The stop unit 114 includes stop blades 114a and 114b. An open-and-close state of the stop blades 114a and 114b is detected by a hall element 115, and a detection result thereof is input to the lens microcomputer 111 through an amplifier 122 and an A/D converter 123. The lens microcomputer 111 outputs, depending on the input signal from the A/D converter 123, a stop drive signal to a stop driver 121 so as to cause the stop driver 121 to drive a stop actuator 113, thereby controlling a light amount control operation of the stop unit 114.

The interchangeable lens 100 further includes a shake sensor (hereinafter referred to as "a gyro sensor") 129 constituted by a vibration gyro or the like. The lens microcomputer 111 drives an image-stabilizing actuator 126 constituted by a voice coil motor or the like through an image-stabilizing driver 125 depending on a shake (angular velocity) detected by the gyro sensor 129, thereby performing an image-stabilizing process to control the movement of the image-stabilizing lens 103. Moreover, the lens microcomputer 111 performs, when the user performs follow shot for capturing a moving object while panning the camera system, a follow shot assist process to control the movement of the image-stabilizing lens 103 while communicating with the camera microcomputer 205 as described later.

The interchangeable lens 100 includes a timer 130 as a free-run timer that counts time with microsecond accuracy. The interchangeable lens 100 further includes a lens memory (accessory memory) 128 that is constituted by a rewritable volatile memory and that temporarily stores data required for the controls performed by the lens microcomputer 111. The lens microcomputer 111 causes the lens memory 128 to store the angular velocity acquired through the gyro sensor 129 and the time acquired by the timer 130 in relation to each other.

The camera body 200 includes an image sensor 201 constituted by a CCD sensor, a CMOS sensor or the like, an A/D converter 202, a signal processor 203, a recorder (memory) 204, the camera microcomputer 205 and a display unit 206.

The image sensor 201 photoelectrically converts an object image formed by the image-capturing optical system in the interchangeable lens 100 to output an image-capturing signal as an analog electrical signal.

The A/D converter 202 converts the analog image-capturing signal from the image sensor 201 into a digital image-capturing signal. The signal processor 203 performs various image processes on the digital image-capturing signal from the A/D converter 123 to produce a video signal. The signal processor 203 produces, from the video signal, focus information indicating a contrast state of the object image (that is, a focus state of the image-capturing optical system) and luminance information indicating an exposure state. The signal processor 203 outputs the video signal to the display unit 206. The display unit 206 displays the video signal as a live-view image used for checking an image-capturing composition and the focus state. In addition, the signal processor 203 outputs the video signal to the recorder 204. The recorder 204 records the video signal.

The signal processor 203 further produces a vertical synchronization signal at every time of the photoelectric conversion of the object image (charge accumulation) by the image sensor 201 to input the vertical synchronization signal to the camera microcomputer 205. The camera microcomputer 205 acquires a time point at which half of a charge accumulation time period from an input time point of the vertical synchronization signal has elapsed, as a center time of the charge accumulation time period. The charge accumulation time period is an exposure time period for the image sensor 201. The center time of the charge accumulation time period is hereinafter referred to as "an accumulation center time". The signal processor 203 may input a signal indicating the accumulation center time to cause the camera microcomputer 205 to acquire the accumulation center time. The camera microcomputer 205 includes a timer 209 as a free-run timer that counts time with microsecond accuracy.

A camera memory 210 is constituted by a rewritable volatile memory. The camera memory 210 stores the digital image-capturing signal acquired from the image sensor 201, the video signal produced by the signal processor 203 and the lens data received from the lens microcomputer 111. Furthermore, the camera memory 210 temporarily stores data required for various control operations performed by the camera microcomputer 205.

The camera microcomputer 205 as a camera controller controls the camera body 200 in response to inputs from a camera operation unit 207 including an image-capturing instructing switch and various setting switches (not illustrated). The camera microcomputer 205 transmits, in response to a user's operation of a zoom switch (not illustrated), the control command relating to the magnification-varying operation of the magnification-varying lens 102 to the lens microcomputer 111 through a camera communicator 208 included in the camera microcomputer 205. Moreover, the camera microcomputer 205 transmits, through the camera communicator 208, the control command relating to the light amount control operation of the stop unit 114 depending on the luminance information and the control command relating to the focusing operation of the focus lens 104 depending on the focus information. The camera microcomputer 205 performs operations relating to the communication with the lens microcomputer 111 according to a camera communication control program as a computer program.

Figure 2:
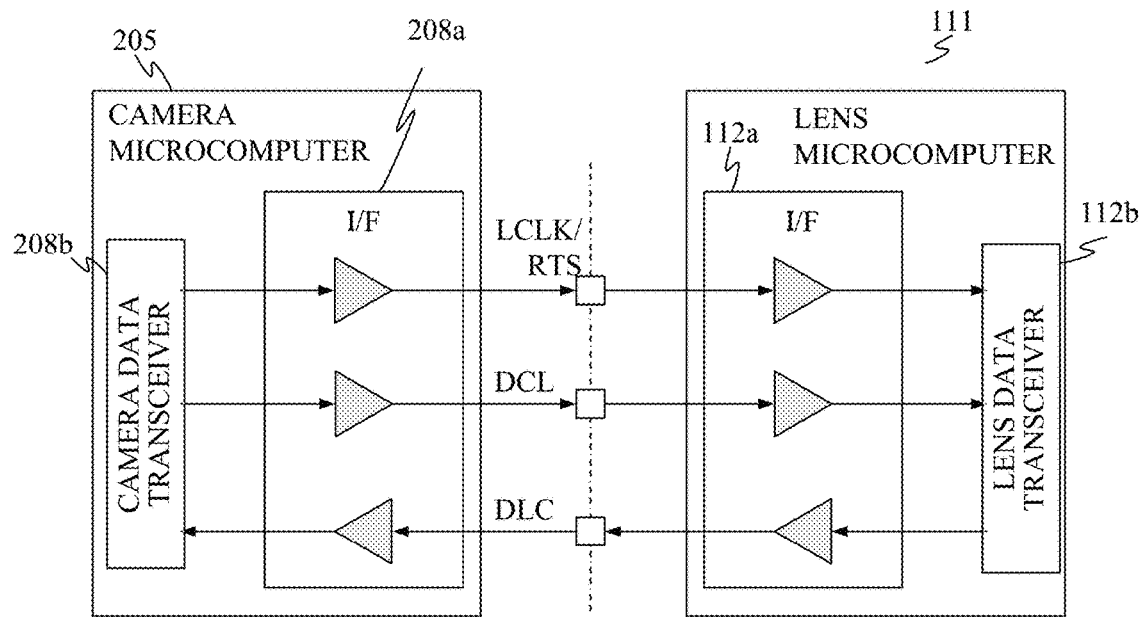
FIG. 2 is a block diagram illustrating a configuration of a communication circuit in Embodiments 1 and 2.

Next, with reference to FIG. 2, description will be made of a communication circuit constituted between the camera body 200 (camera microcomputer 205) and the interchangeable lens 100 (lens microcomputer 111) and of the communication performed therebetween. The camera microcomputer 205 has a function of managing settings for the communication with the lens microcomputer 111 and a function of providing notices such as the transmission requests. On the other hand, the lens microcomputer 111 has a function of producing lens data and a function of transmitting the lens data.

The camera microcomputer 205 includes a camera communication interface circuit 208a, and the lens microcomputer 111 includes a lens communication interface circuit 112a. The camera microcomputer 205 (camera data transceiver 208b) and the lens microcomputer 111 (lens data transceiver 112b) communicate with each other through the communication terminals (illustrated by three boxes) provided in the mount 300 and the camera and lens communication interface circuits 208a and 112a. In this embodiment, the camera and lens microcomputers 205 and 111 perform three-wire asynchronous serial communication using three channels. The camera data transceiver 208b and the camera communication interface circuit 208a constitute the camera communicator 208. The lens data transceiver 112b and the lens communication interface circuit 112a constitute the lens communicator 112. Although, a three-wire asynchronous serial communication using three channels is used in this embodiment, other number-wire serial communication and channels are possible.

The three channels are a transmission request channel as a notification channel, a first data communication channel and a second data communication channel. The transmission request channel is used for providing the notices such as the transmission requests (transmission instructions) for the lens data and switch requests (switch instructions) for communication settings described later, from the camera microcomputer 205 to the lens microcomputer 111. The provision of the notice through the transmission request channel is performed by switching a signal level (voltage level) on the transmission request channel between High as a first level and Low as a second level. A transmission request signal provided to the transmission request channel is hereinafter referred to as "a request-to-send signal RTS".

The first data communication channel is used for transmitting the lens data from the lens microcomputer 111 to the camera microcomputer 205. The lens data (accessory data) transmitted as a signal from the lens microcomputer 111 to the camera microcomputer 205 through the first data communication channel is hereinafter referred to as "a lens data signal DLC". The second data communication channel is used for transmitting camera data from the camera microcomputer 205 to the lens microcomputer 111. The camera data transmitted as a signal from the camera microcomputer 205 to the lens microcomputer 111 through the second data communication channel is hereinafter referred to as "a camera data signal DCL". The request-to-send signal RTS is provided from the camera microcomputer 205 as a communication master to the lens microcomputer 111 as a communication slave. The camera data signal DCL includes various control commands and transmission request commands transmitted from the camera microcomputer 205 to the lens microcomputer 111. The lens data signal DLC includes various lens data transmitted from the lens microcomputer 111 to the camera microcomputer 205. The camera and lens microcomputers 205 and 111 set their communication speed beforehand and perform the communication (transmission and receipt) at a communication bit rate according to this setting. The communication bit rate indicates a data amount transferable per second and is expressed with a unit of bps (bits per second). The camera and lens microcomputers 205 and 111 communicate with each other by a full-duplex communication method enabling mutual transmission and receipt of data.

Figure 3:
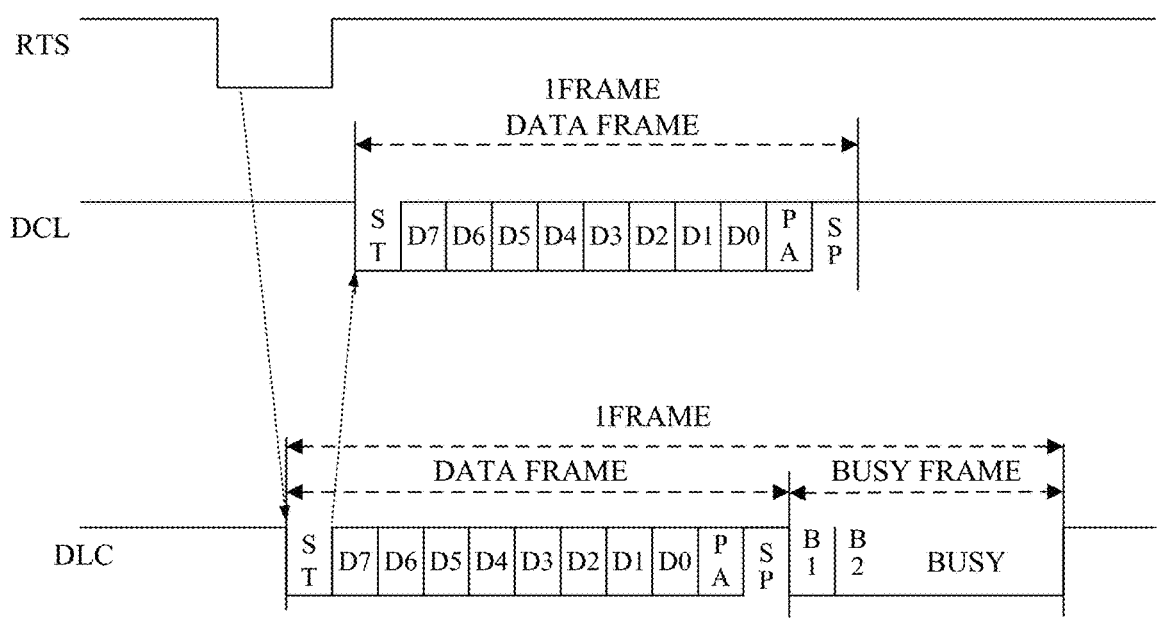
FIG. 3 illustrates waveforms of signals transmitted and received between a camera body and an interchangeable lens in Embodiments 1 and 2.

With reference to FIG. 3, description will be made of communication procedures between the camera and lens microcomputers 205 and 111. FIG. 3 illustrates waveforms of communication signals in one frame as a minimum communication unit. The camera data signal DCL and the lens data signal DLC have mutually different parts in their data formats in the one frame.

First, description will be made of the data format of the lens data signal DLC. The lens data signal DLC in the one frame includes, as large parts, a data frame as a first frame and a BUSY frame as a subsequent frame.

The signal level of the lens data signal DLC is held at High in a non-transmission state where data transmission is not performed.

The lens microcomputer 111 sets the signal level to Low in one bit time period in order to provide a notice of a start of one frame transmission of the lens data signal DLC to the camera microcomputer 205. This one bit time period is called "a start bit ST" at which one data frame is started. Next, the lens microcomputer 111 transmits one-byte lens data in eight bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0.

Then, the lens microcomputer 111 adds one bit parity information PA at tenth bit and sets the signal level of the lens data signal DLC to High in a time period of a stop bit SP indicating an end of the one frame. Thus, the data frame starting from the start bit ST ends.

Thereafter, the lens microcomputer 111 adds the BUSY frame after the stop bit SP. The BUSY frame indicates a time period of a communication standby request BUSY as a notice (hereinafter referred to as "a BUSY notice") from the lens microcomputer 111 to the camera microcomputer 205. The lens microcomputer 111 holds the signal level of the lens data signal DLC to Low until terminating the communication standby request BUSY.

Description will be made of a method of determination of presence and absence of the BUSY notice; the determination is performed by the camera microcomputer 205. The waveform illustrated in FIG. 3 includes bit positions B1 and B2. The camera microcomputer 205 selects one of these bit positions B1 and B2 as a BUSY determination position P for determining the presence and absence of the BUSY notice.

As described above, this embodiment employs a data format that selects the BUSY determination position P from the bit positions B1 and B2. This data format enables addressing a problem that a process time from the transmission of the data frame of the lens data signal DLC until the determination of the presence of the BUSY notice (the lens data signal DLC is set to Low) is changed depending on a processing performance of the lens microcomputer 111. Whether to select the bit position B1 or B2 as the BUSY determination position P is set by the communication between the camera and lens microcomputers 205 and 111 before the data communication therebetween is performed. The BUSY determination position P is not necessary to be fixed at the bit position B1 or B2 and may be changed depending on processing capabilities of the camera and lens microcomputers 205 and 111.

Next, description will be made of a data format of the camera data signal DCL. Specifications of the data format of the camera data signal DCL in one frame are common to those of the lens data signal DLC.

However, the addition of the BUSY frame to the camera data signal DCL is prohibited, which is different from the lens data signal DLC.

Next, the communication procedures between the camera and lens microcomputers 205 and 111 will be described. The camera microcomputer 205 sets a signal level of the request-to-send signal RTS to Low (in other words, asserts the request-to-send signal RTS) to provide the transmission request to the lens microcomputer 111. The lens microcomputer 111 having detected the transmission request through the assertion (Low) of the request-to-send signal RTS performs a process to produce the lens dada signal DLC to be transmitted to the camera microcomputer 205. Then, after a preparation of the transmission of the lens data signal DLC is completed, the lens microcomputer 111 starts transmitting one frame of the lens data signal DLC through the first data communication channel.

The lens microcomputer 111 starts the transmission of the lens data signal DLC within a time period mutually set by the camera and lens microcomputers 205 and 111 after the assertion of the request-to-send signal RTS. That is, for the lens microcomputer 111, a strict restriction is not provided that it is necessary to set the lens data to be transmitted before a first clock pulse is input thereto in a time period from the assertion of the request-to-send signal RTS to a start of the transmission of the lens data signal DLC.

Next, in response to detecting the start bit ST as a head bit of the data frame of the lens data signal DLC received from the lens microcomputer 111 (that is, in response to a start of receiving the lens data signal DLC), the camera microcomputer 205 returns the signal level of the request-to-send signal RTS to High, in other words, negates the request-to-send signal RTS.

The camera microcomputer 205 thereby terminates the transmission request and starts the transmission of the camera data signal DCL through the second data communication channel. The negation of the request-to-send signal RTS may be performed any one of before and after the start of the transmission of the camera data signal DCL. It is only necessary that these negation and transmission be performed until the receipt of the data frame of the lens data signal DLC is completed.

The lens microcomputer 111 having transmitted the data frame of the lens data signal DLC adds the BUSY frame to the lens data signal DLC in a case where the BUSY notice is necessary to be provided to the camera microcomputer 205. The camera microcomputer 205 monitors the presence or absence of the BUSY notice and prohibits the assertion of the request-to-send signal RTS for a next transmission request while the BUSY notice is provided. The lens microcomputer 111 executes necessary processes in a time period where the transmission request from the camera microcomputer 205 is prohibited by the BUSY notice and terminates the BUSY notice after a next communication preparation is completed. The assertion of the request-to-send signal RTS by the camera microcomputer 205 for the next transmission request is permitted under a condition that the BUSY notice is terminated and the transmission of the data frame of the camera data signal DCL is completed.

As just described, in this embodiment, in response to the assertion of the request-to-send signal RTS upon a communication starting event generated in the camera microcomputer 205, the lens microcomputer 111 starts transmitting the data frame of the lens data signal DLC to the camera microcomputer 205. On the other hand, the camera microcomputer 205 having detected the start bit ST of the lens data signal DLC starts transmitting the data frame of the camera data signal DCL to the lens microcomputer 111. The lens microcomputer 111 adds, as needed, the BUSY frame to the data frame of the lens data signal DLC for providing the BUSY notice and then terminates the BUSY notice to end one frame communication process. In this communication process, the camera microcomputer 205 and the lens microcomputer 111 mutually transmit and receive one byte data.

Figure 4:
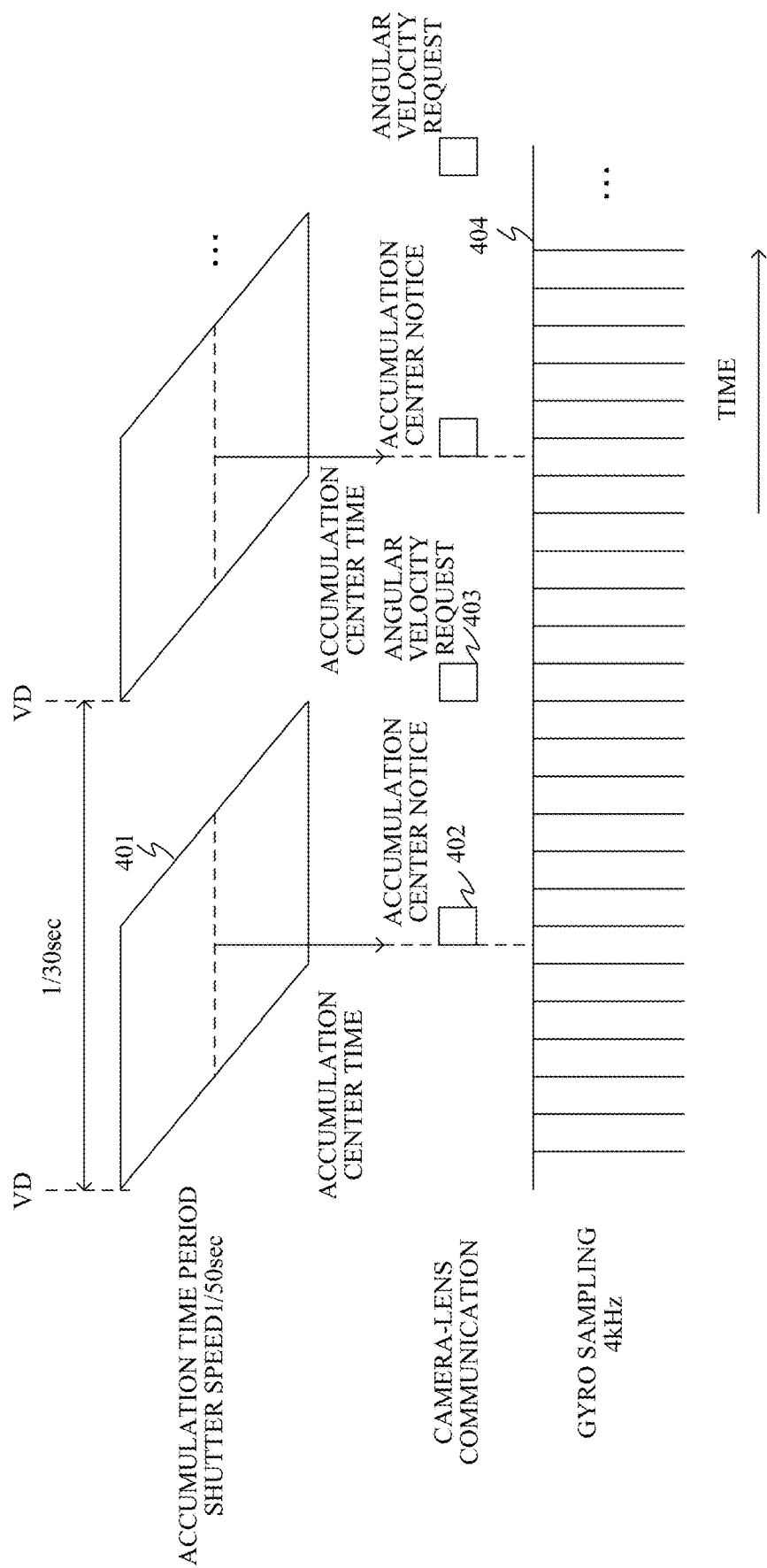
FIG. 4 illustrates communication times between the camera body and an interchangeable lens in Embodiments 1 and 2.

Next, description will be made of the follow shot assist process performed in the camera system of this embodiment. FIG. 4 illustrates communication times between the camera and lens microcomputers 205 and 111 and acquisition times of the angular velocity from the gyro sensor 129 in the follow shot assist process. An accumulation time period 401 is a charge accumulation time period in the image sensor 201 for each image-capturing frame. The image sensor 201 performs charge accumulation in response to a vertical synchronization signal VD as a trigger. The vertical synchronization signal VD is produced at every predetermined image-capturing frame time period (1/30 seconds in this embodiment). That is, the time at which the vertical synchronization signal VD is produced is a start time of the charge accumulation in the image sensor 201.

This embodiment sets a length of the charge accumulation time period (shutter speed) to 1/50 seconds. Each accumulation time period 401 (that is, each image-capturing frame) is provided with a frame identifier for identifying that accumulation time period 401 from other accumulation time periods 401.

The camera microcomputer 205 provides, at every accumulation center time that is a center time of the above-described charge accumulation time period (accumulation time period 401) of the image sensor 201, an accumulation center notice 402 to the lens microcomputer 111 through the transmission of the camera data signal DCL. The accumulation center notice 402 includes information on a delay time from an accumulation center time point that is a time point corresponding to the accumulation center time set in response to the BUSY notice from the lens microcomputer 111. The accumulation center notice 402 further includes the frame identifier for identifying a current accumulation time period (that is, a current image-capturing frame). The camera microcomputer 205 can acquire the accumulation center time point from the timer 209. The accumulation center time point (predetermined time point) acquired by the camera microcomputer 205 is hereinafter referred to as "a camera accumulation center time point".

In the interchangeable lens 100, the gyro sensor 129 detects the angular velocity with a sampling frequency of 4 kHz. The lens microcomputer 111 stores, at every time of acquiring the angular velocity with this sampling frequency (the time is hereinafter referred to as "an angular velocity sampling time"), the acquired angular velocity with a time point acquired thereat from the timer 130 to the lens memory 128.

The lens microcomputer 111 having received the accumulation center notice 402 calculates a lens accumulation center time point by using an RTS time point described later and the delay time included in the accumulation center notice 402. Then, the lens microcomputer 111 calculates an angular velocity at the lens accumulation center time point (the angular velocity is accessory information and hereinafter referred to as "an accumulation center angular velocity") by a linear interpolation method using the angular velocity and time point stored in the lens memory 128. The lens microcomputer 111 further stores the calculated accumulation center angular velocity and the received frame identifier in relation to each other to the lens memory 128. The camera microcomputer 205 sets, to the camera data signal DCL in the camera communicator 208 after an elapse of a predetermined time from the transmission of the accumulation center notice 402, an angular velocity request 403 for requesting acquisition (transmission) of the angular velocity and starts communication with the lens microcomputer 111 to provide thereto the angular velocity request 403. The lens microcomputer 111 having received the angular velocity request 403 transmits the accumulation center angular velocity and the frame identifier related therewith (this frame identifier is hereinafter referred to as "an angular velocity detection frame identifier") by the lens data signal DCL to the camera microcomputer 205.

The camera microcomputer 205 acquires (calculates), in every image-capturing frame, a movement amount of the object image (the movement amount is camera information) in the video image produced from the image-capturing signal acquired using the image sensor 201, that is, on an image-capturing surface of the image sensor 201. The movement amount of the object image calculated in each image-capturing frame corresponds to a movement amount thereof at the accumulation center time in that image-capturing frame.

Then, the camera microcomputer 205 calculates a follow shot correction amount (as control information) for a current image-capturing frame from the calculated movement amount of the object image on the image-capturing surface and the accumulation center angular velocity acquired from the lens microcomputer 111. This calculation (production) of the follow shot correction amount corresponds to a camera process relating to image capturing. When calculating the follow shot correction amount, the camera microcomputer 205 checks whether or not the frame identifier of the charge accumulation time period in which the movement amount of the object image on the image-capturing surface has been calculated (this frame identifier is hereinafter referred to as "a movement amount calculation frame identifier") is identical to the angular velocity detection frame identifier received from the lens microcomputer 111. If these frame identifiers are identical to each other, the camera microcomputer 205 calculates the follow shot correction amount for the current image-capturing frame. If these frame identifiers are not identical to each other, the camera microcomputer 205 uses the follow shot correction amount calculated for a previous image-capturing frame as that for the current image-capturing frame.

The camera microcomputer 205 transmits, in response to a user's image-capturing instruction from the camera operation unit 207, a follow shot correction notice including the calculated follow shot correction amount to the lens microcomputer 111. The lens microcomputer 111 having received the follow shot correction notice drives the image-stabilizing actuator 126 through the image-stabilizing driver 125 by a drive amount corresponding to the follow shot correction amount included in the follow shot correction notice.

The lens microcomputer 111 thus controls the movement of the image-stabilizing lens 103 to perform the follow shot assist process.

Figure 5:
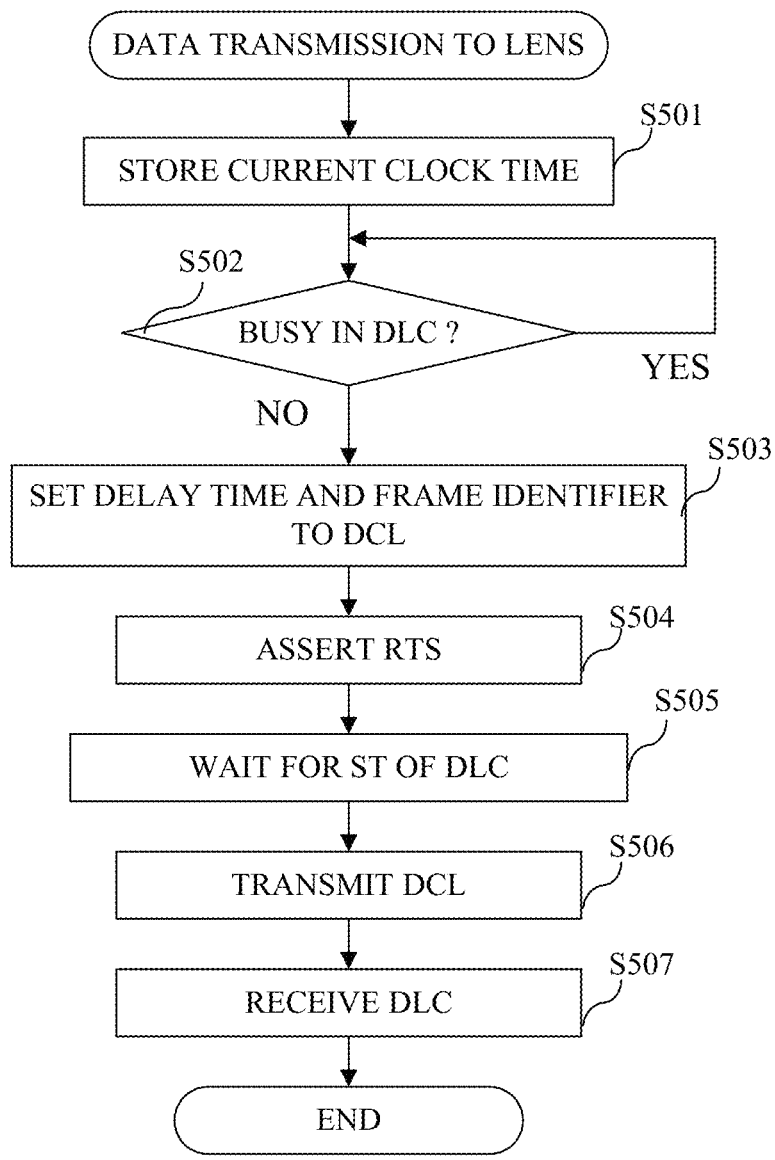
FIG. 5 is a flowchart illustrating a process performed in the camera body in Embodiment 1.

FIG. 5 is a flowchart illustrating a process performed by the camera microcomputer 205 for causing the lens microcomputer 111 to recognize an accurate accumulation center time point. The camera microcomputer 205 executes this process and other processes described later according to the above-mentioned camera communication control program.

The camera microcomputer 205 having acquired the accumulation center time in response to the vertical synchronization signal input from the signal processor 203 or directly from the signal processor 203 proceeds to step S501. At step S501, the camera microcomputer 205 acquires a current time point from the timer 209 to store it as the camera accumulation center time point that is the time point of acquiring the accumulation center time to the camera memory 210.

Next, at step S502, the camera microcomputer 205 checks whether or not the BUSY notice is provided by the lens data signal DLC. If the BUSY notice is provided, the camera microcomputer 205 again checks whether or not the BUSY notice is provided. If the BUSY notice is terminated (in other words, after receipt of the lens data signal DLC is completed), the camera microcomputer 205 proceeds to step S503.

At step S503, the camera microcomputer 205 acquires a current time point from the timer 209 and calculates a difference (delay time) between the current time point at which the BUSY notice is terminated and the camera accumulation center time point stored at step S501 in the camera memory 210. Then, the camera microcomputer 205 sets the calculated delay time and the frame identifier for identifying a current image-capturing frame to the camera data signal DCL.

Thereafter, at step S504, the camera microcomputer 205 asserts the request-to-send signal RTS to cause the lens microcomputer 111 to start communication with the camera microcomputer 205. At step S505, the camera microcomputer 205 waits for the start bit ST of the lens data signal DLC transmitted from the lens microcomputer 111. The lens data signal DLC transmitted here from the lens microcomputer 111 corresponds to mere response data including no significant information.

At step S506, the camera microcomputer 205 having detected the start bit ST of the lens data signal DLC transmits the camera data signal DCL set at step S503 to the lens microcomputer 111. That is, the camera microcomputer 205 transmits, by the camera data signal DCL, the accumulation center notice (the delay time from the camera accumulation center time point and the frame identifier) as a specific command to the lens microcomputer 111. The camera microcomputer 205 detects the start bit ST of the lens data signal DLC and starts the transmission of the accumulation center notice without delay from the termination of the BUSY notice by the lens microcomputer 111 and the assertion of the request-to-send signal RTS by the camera microcomputer 205. Therefore, the above-described delay time can be regarded as a delay time from the camera accumulation center time point until a time point at which the transmission and receipt of the accumulation center notice are started in response to the assertion of the request-to-send signal RTS.

Then, at step S507, the camera microcomputer 205 receives the lens data signal DLC from the lens microcomputer 111. In this embodiment, the lens data signal DLC received here by the camera microcomputer 205 includes no significant information.

Next, with reference to a flowchart of FIG. 6, description will be made of a process performed by the camera microcomputer 205 for acquiring the angular velocity from the lens microcomputer 111. The camera microcomputer 205 having acquired the movement amount of the object image (hereinafter referred to as "an object movement amount in a current image-capturing frame") on the image-capturing surface from the video signal produced using the image sensor 201 proceeds to step S901.

At step S901, the camera microcomputer 205 sets the angular velocity request to the camera data signal DCL in the camera communicator 208 to start communication for transmitting the angular velocity request to the lens microcomputer 111. At step S902, the camera microcomputer 205 receives the accumulation center angular velocity by the lens data signal DLC from the lens microcomputer 111. The lens data signal DLC received here includes the angular velocity detection frame identifier related to the accumulation center angular velocity.

Next, at step S903, the camera microcomputer 205 checks whether or not the movement amount calculation frame identifier related to the object movement amount in the current image-capturing frame is identical to the angular velocity detection frame identifier received from the lens microcomputer 111 at step S902. If these frame identifier are identical to each other, the camera microcomputer 205 proceeds to step S904. If these frame identifier are not identical to each other, the camera microcomputer 205 proceeds to step S905.

At step S904, the camera microcomputer 205 calculates, from the object movement amount in the current image-capturing frame and the accumulation center angular velocity received at step S902, the follow shot correction amount for the current image-capturing frame. Then, the camera microcomputer 205 stores the calculated follow shot correction amount with the accumulation center time point to the camera memory 210.

On the other hand, at step S905, the camera microcomputer 205 reads out, from the camera memory 210, the follow shot correction amount calculated and stored for a one previous image-capturing frame. Then, the camera microcomputer 205 stores this one previous follow shot correction amount as the follow shot correction amount for the current image-capturing frame with the accumulation center time point in the current image-capturing frame to the camera memory 210.

Next, at step S906, the camera microcomputer 205 determines whether or not the user's image capturing instruction is input from the camera operation unit 207.

If the user's image capturing instruction is input, the camera microcomputer 205 proceeds to step S907 to transmit the follow shot correction notice including the follow shot correction amount stored in the camera memory 210 at step S904 or S905 to the lens microcomputer 111 by the camera data signal DCL. Then, the camera microcomputer 205 ends this process.

Next, with reference to a flowchart of FIG. 7, description will be made of a process performed by the lens microcomputer 111. The lens microcomputer 111 executes this process and other processes described later according to the above-mentioned lens communication control program.

In response to detecting at step S601 the assertion of the request-to-send signal RTS by the camera microcomputer 205 at step S504 in FIG. 5, the lens microcomputer 111 proceeds to step S602. At step S602, the lens microcomputer 111 acquires a current time point from the timer 130 to store it, to the lens memory 128, as an RTS time point (first time point) at which the request-to-send signal RTS is asserted.

Next, at step S603, the lens microcomputer 111 checks whether or not there is any process to be prioritized than the follow shot assist process. Such processes to be prioritized include the zoom process and the AF process. If there is such a process to be prioritized, the lens microcomputer 111 returns to step S603. If there is no process to be prioritized, the lens microcomputer 111 proceeds to step S604.

At step S604, the lens microcomputer 111 transmits the lens data signal DLC to the camera microcomputer 205. The lens data signal DLC transmitted here is the response data received by the camera microcomputer 205 at step S505 in FIG. 5 and includes no significant information.

Next, at step S605, the lens microcomputer 111 receives the camera data signal DCL from the camera microcomputer 205. Then, at step S606, the lens microcomputer 111 interprets a command included in the received camera data signal DCL. Such commands included in the received camera data signal DCL include the focus drive command and the accumulation center notice; each command is constituted by a command and its arguments. The argument of the accumulation center notice is constituted by the delay time from the camera accumulation center time point and the frame identifier.

Next, at step S607, the lens microcomputer 111 determines whether or not the received command is the accumulation center notice as the specific command. If the received command is the accumulation center notice, the lens microcomputer 111 proceeds to step S608. If the received command is not the accumulation center notice, the lens microcomputer 111 ends this process.

At step S608, the lens microcomputer 111 subtracts the delay time received at step S606 from the RTS time point stored in the lens memory 128 to acquire the lens accumulation center time point (second time point). The delay time subtracted from the RTS time point can be regarded, as described above, as the delay time from the camera accumulation center time point to the time point at which the receipt of the accumulation center notice is started by the lens microcomputer 111. The time point at which the receipt of the accumulation center notice is started corresponds to the RTS time point. Thus, the lens accumulation center time point calculated using these RTS time point and the delay time corresponds to the camera accumulation center time point.

Next, at step S609, the lens microcomputer 111 calculates the accumulation center angular velocity by the linear interpolation method using multiple combinations of the angular velocity stored in the lens memory 128 at each angular velocity sampling time and the time point of acquiring that angular velocity. The lens microcomputer 111 further stores, to the lens memory 128, the calculated accumulation center angular velocity and the frame identifier received at step S606 (this frame identifier becomes the angular velocity detection frame identifier) in relation to each other. Then, the lens microcomputer 111 ends this process.

Next, with reference to a flowchart of FIG. 8, description will be made of a process performed by the lens microcomputer 111 for transmitting the accumulation center angular velocity to the camera microcomputer 205. In response to receiving the angular velocity request at step S1001 by the camera data signal DCL from the camera microcomputer 205, the lens microcomputer 111 proceeds to step S1002.

At step S1002, the lens microcomputer 111 reads out the accumulation center angular velocity and the angular velocity detection frame identifier related therewith from the lens memory 128, and deletes these read-out accumulation center angular velocity and angular velocity detection frame identifier from the lens memory 128.

Next, at step S1003, the lens microcomputer 111 transmits the accumulation center angular velocity and the angular velocity detection frame identifier read out at step S1002 to the camera microcomputer 205 by the lens data signal DLC.

In this embodiment, the camera microcomputer 205 transmits the delay time from the camera accumulation center time point set in response to the BUSY frame added to the lens data signal DLC to the lens microcomputer 111 by the camera data signal DCL. The lens microcomputer 111 subtracts the camera accumulation center time point from the RTS time point and thereby can acquire the lens accumulation center time point corresponding to an accurate accumulation center time point in the camera body 200. This process enables the lens microcomputer 111 to acquire the accurate accumulation center time point in the camera body 200 even though the BUSY frame is added to the lens data signal DLC or the transmission of the lens data signal DLC is delayed.

As a result, the interchangeable lens 100 can acquire the angular velocity (accumulation center angular velocity) at the time point of acquiring the object movement amount on the image-capturing surface in the camera body 200. That is, an accurate synchronization can be achieved between the time of acquiring the object movement amount on the image-capturing surface in the camera body 200 and the time of acquiring the angular velocity in the interchangeable lens 100. Accordingly, a decrease in accuracy of the follow shot assist process due to a difference between the time point of acquiring the object movement amount on the image-capturing surface and the time point of acquiring the angular velocity can be avoided. In other words, a highly accurate (good) follow shot assist process can be performed.

Embodiment 2

Next, description will be made of a second embodiment (Embodiment 2) of the present invention. Embodiment 1 described the case where the camera microcomputer 205 cannot request the lens microcomputer 111 to perform communication (that is, cannot assert the request-to-send signal RTS) while the lens microcomputer 111 is transmitting the BUSY notice. On the other hand, this embodiment will describe a case where the camera microcomputer 205 can assert the request-to-send signal RTS while the lens microcomputer 111 is transmitting the BUSY notice.

Configurations of an interchangeable lens 100 and a camera body 200 are the same as those in Embodiment 1, and constituent elements common to those in Embodiment 1 are denoted by the same reference numerals as those in Embodiment 1.

Figure 9:
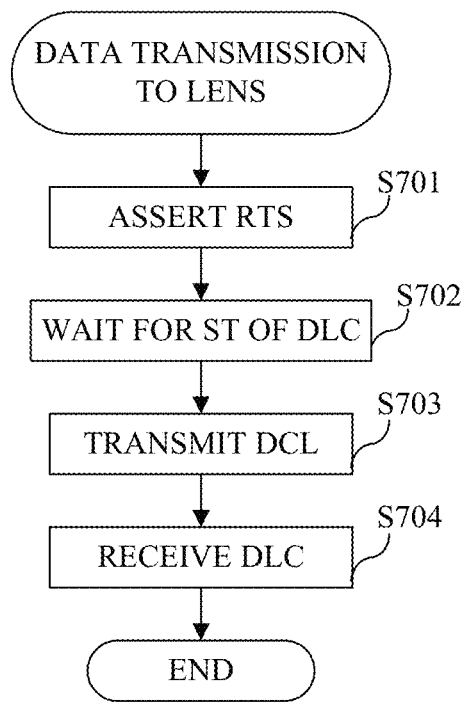
FIG. 9 is a flowchart illustrating a process performed in a camera body in Embodiment 2.

With reference to a flowchart of FIG. 9, description will be made of a process performed by the camera microcomputer 205 in this embodiment. The camera microcomputer 205 having acquired the accumulation center time in response to the vertical synchronization signal input from the signal processor 203 or directly from the signal processor 203 proceeds to step S701. At step S701, regardless of whether or not the lens microcomputer 111 is transmitting the BUSY notice, the camera microcomputer 205 asserts the request-to-send signal RTS to cause the lens microcomputer 111 to start communication.

Then, in response to detecting the start bit ST of the lens data signal DLC transmitted from the lens microcomputer 111 at step S703, the camera microcomputer 205 transmits the accumulation center notice as the specific command to the lens microcomputer 111 by the camera data signal DCL. In this embodiment, the camera microcomputer 205 having acquired the accumulation center time immediately asserts the request-to-send signal RTS, and the lens microcomputer 111 transmits the lens data signal DLC to the camera microcomputer 205 in response to the assertion of the request-to-send signal RTS. The camera microcomputer 205 further transmits the accumulation center notice to the lens microcomputer 111 in response to detecting the start bit ST of the received lens data signal DLC. The accumulation center notice is transmitted without delay from the assertion of the request-to-send signal RTS (that is, from the acquisition of the accumulation center time). Therefore, the accumulation center notice can be regarded as being performed at the same time point as the camera accumulation center time point.

Step S704 is identical to step S507 in FIG. 5 described in Embodiment 1.

Figure 10:
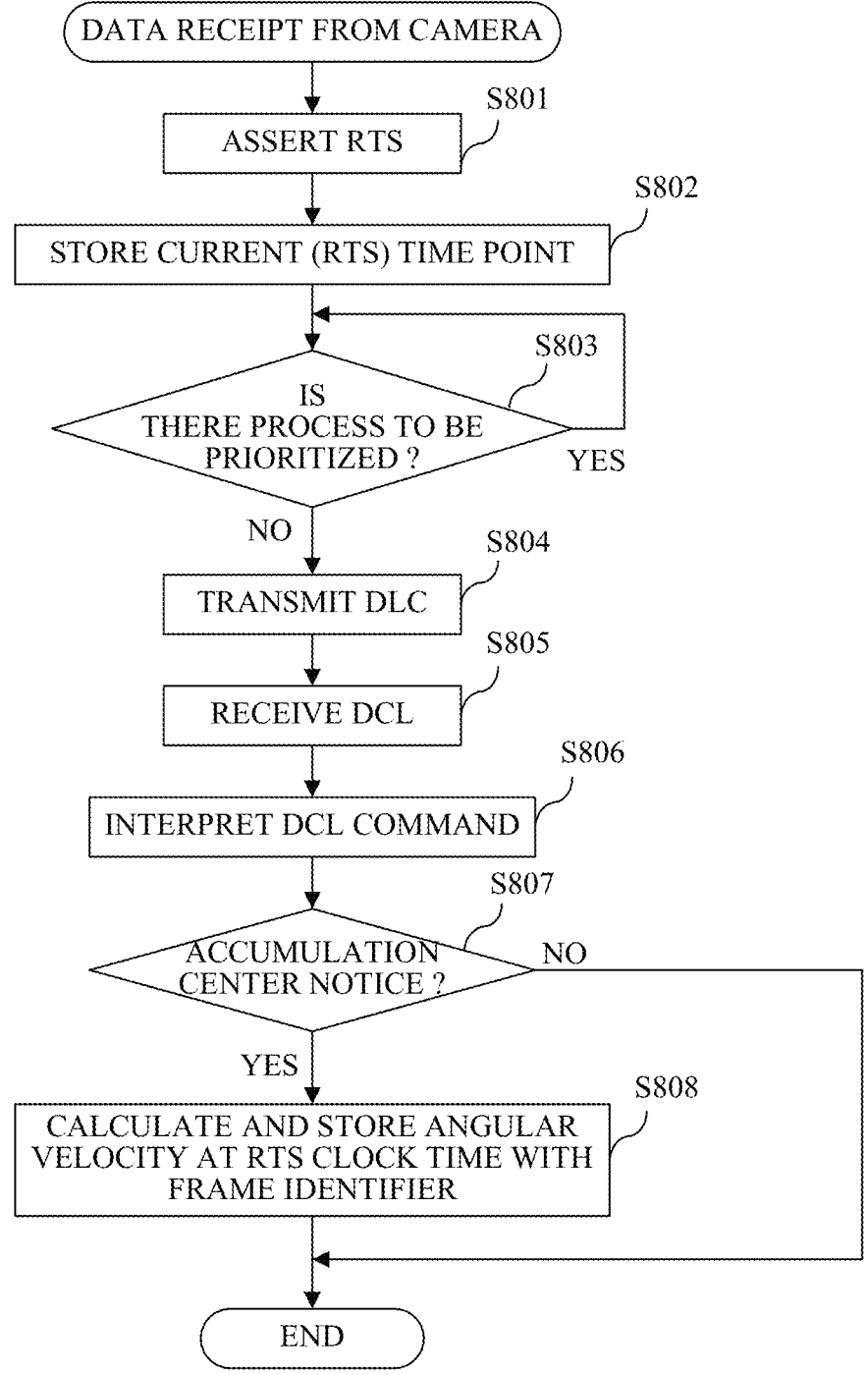
FIG. 10 is a flowchart illustrating a process performed in an interchangeable lens in Embodiment 2.

Next, with reference to a flowchart of FIG. 10, description will be made of a process performed by the lens microcomputer 111 in this embodiment. In response to detecting at step S801 the assertion of the request-to-send signal RTS by the camera microcomputer 205 at step S701 in FIG. 9, the lens microcomputer 111 proceeds to step S802.

At step S802, the lens microcomputer 111 acquires a current time point from the timer 130 to store it, to the lens memory 128, as an RTS time point (first time point) at which the request-to-send signal RTS is asserted. In this embodiment, as described above, the camera microcomputer 205 having acquired the accumulation center time immediately asserts the request-to-send signal RTS (step S701 in FIG. 9). Therefore, the RTS time point at which the lens microcomputer 111 detects the assertion corresponds to the lens accumulation center time point corresponding to the time point (camera accumulation center time point) at which the camera microcomputer 205 acquires the accumulation center time.

Figure 7:
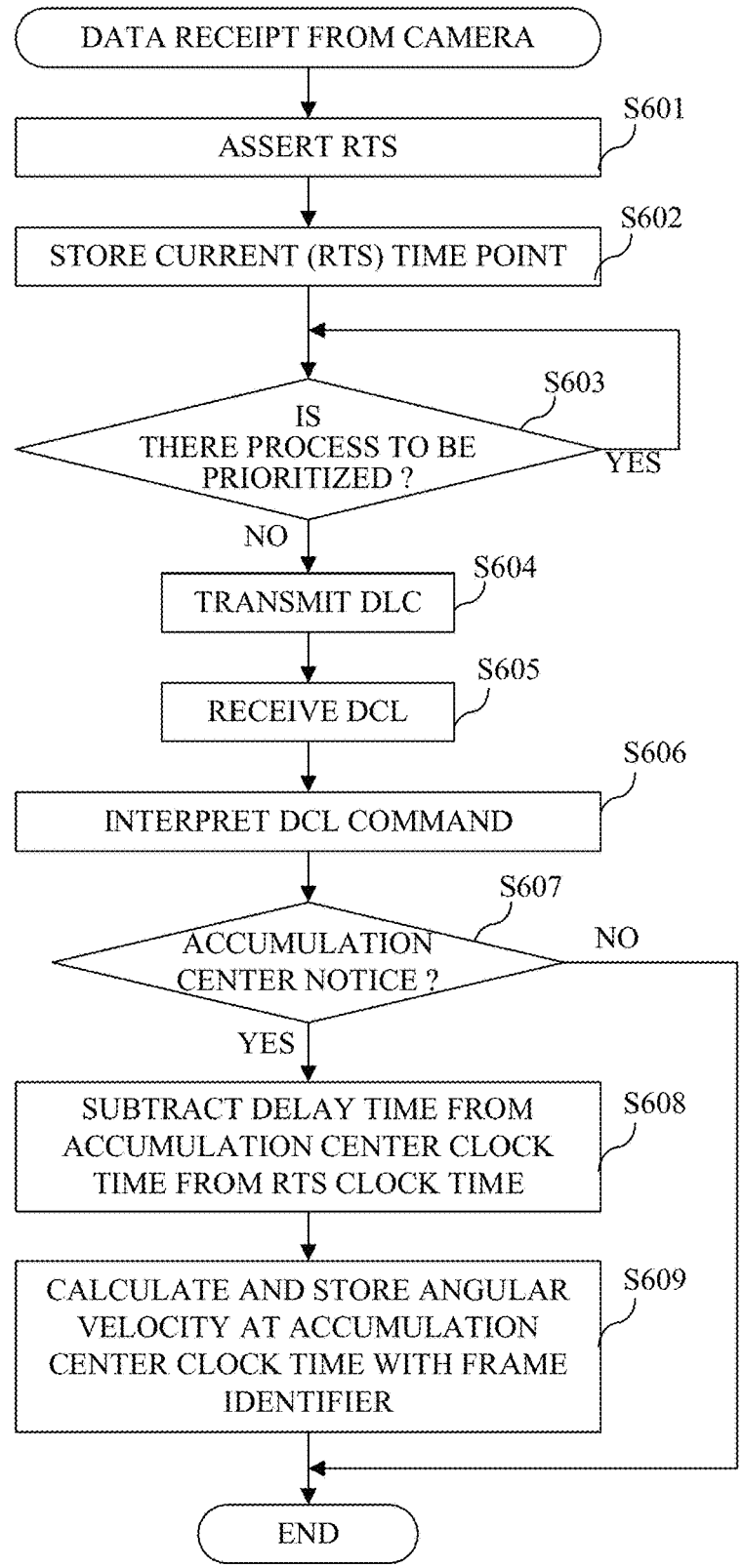
FIG. 7 is a flowchart illustrating a process performed in the interchangeable lens in Embodiment 1.

Subsequent steps S803 to S807 are identical to steps S603 to S607 in FIG. 7 described in Embodiment 1.

When the command received at step S807 from the camera microcomputer 205 is the accumulation center notice as the specific command, the lens microcomputer 111 proceeds to step S808. At step S808, the lens microcomputer 111 calculates the angular velocity at the RTS time point, that is, the accumulation center angular velocity by the linear interpolation method using multiple combinations of the angular velocity stored in the lens memory 128 at each angular velocity sampling time and the time point of acquiring that angular velocity. The lens microcomputer 111 further stores, to the lens memory 128, the calculated angular velocity at the RTS time point and the frame identifier received at step S806 (this frame identifier becomes the angular velocity detection frame identifier) in relation to each other. Then, the lens microcomputer 111 ends this process.

Figure 6:
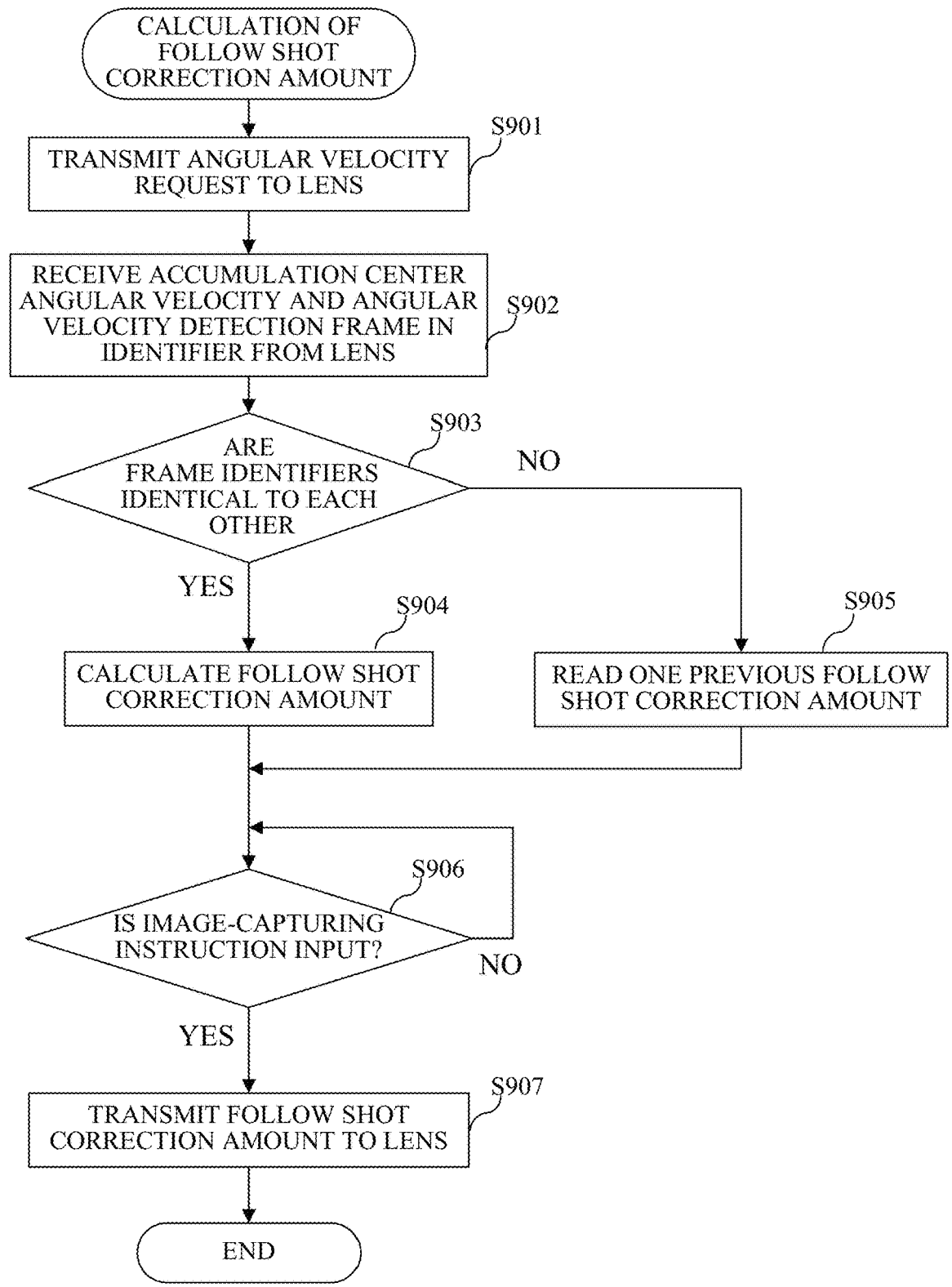
FIG. 6 is a flowchart illustrating another process performed in the camera body in Embodiment 1.
Figure 8:
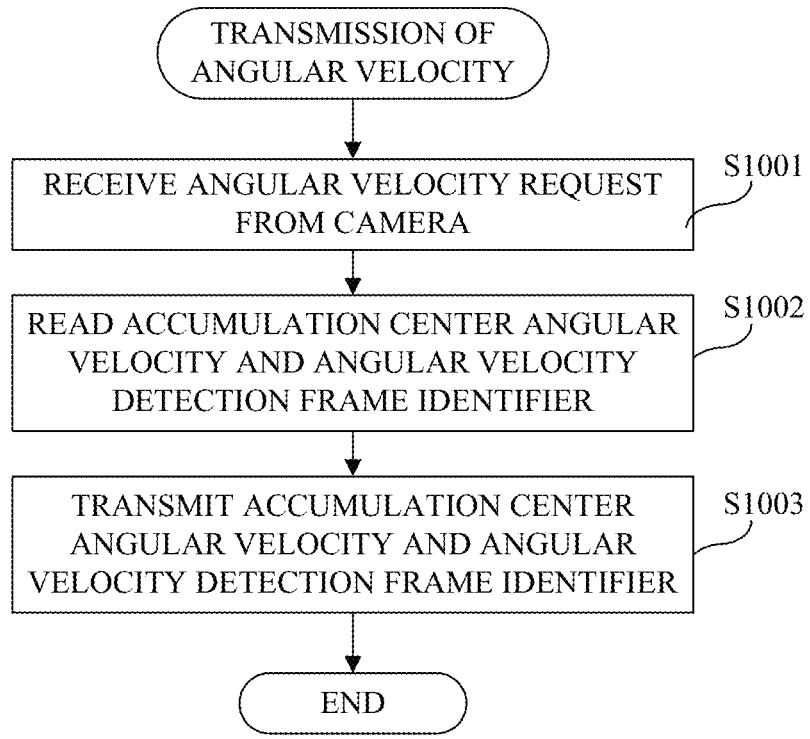
FIG. 8 is a flowchart illustrating another process performed in the interchangeable lens in Embodiment 1.

Also in this embodiment, the camera microcomputer 205 performs the same process as that described in Embodiment 1 with reference to FIG. 6, and the lens microcomputer 111 performs the same process as that described in Embodiment 1 with reference to FIG. 8. Thus, the follow shot assist process is performed.

As described above, in this embodiment the camera microcomputer 205 having acquired the accumulation center time immediately asserts the request-to-send signal RTS even though the BUSY notice is being transmitted from the lens microcomputer 111. Therefore, the lens microcomputer 111 acquires the RTS time point at which the request-to-send signal RTS is asserted by the camera microcomputer 205 as the lens accumulation center time point. This process enables the lens microcomputer 111 to acquire the accurate accumulation center time point in the camera body 200 even though the BUSY frame is added to the lens data signal DLC or the transmission of the lens data signal DLC is delayed.

As a result, an accurate synchronization can be achieved between the time of acquiring the object movement amount on the image-capturing surface in the camera body 200 and the time of acquiring the angular velocity in the interchangeable lens 100, and thereby a highly accurate (good) follow shot assist process can be performed.

Each of the above embodiments described the case where the lens microcomputer 111 acquires the angular velocity as the accessory information changing with time. However, the accessory information may be other information such as a position of the magnification-varying lens 102, the focus lens 104 or the image-stabilizing lens 103 as long as information changing with time. Furthermore, although each of the above embodiments described the case of performing the follow shot assist process, the communication described in each of the above embodiments can be used in a case of performing other process than the follow shot assist process, such as a control process or a calculation process.

Each of the above embodiments enables, in the lens-interchangeable camera system, performing a process such as a control process or a calculation process using data whose acquisition times are accurately synchronized with each other.

Embodiment 3

Figure 11:
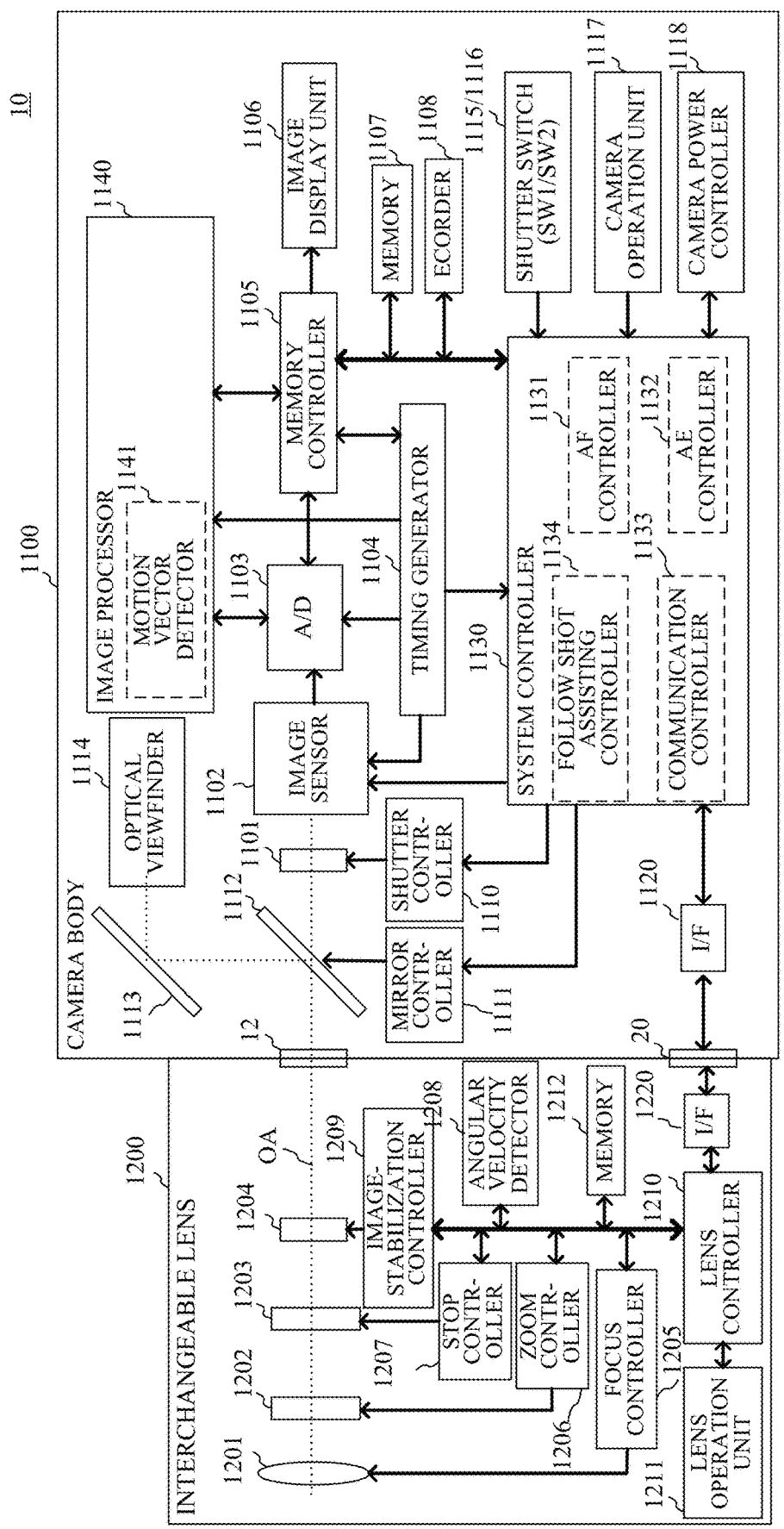
FIG. 11 is a block diagram illustrating a configuration of a camera system according to Embodiments 3 and 4 of the present invention.

With reference to FIG. 11, description will be made of a lens-interchangeable camera system 10 as an image-capturing system (or an image-capturing apparatus) of a third embodiment (Embodiment 3) of the present invention. FIG. 11 illustrates a configuration of the camera system 10 of this embodiment. The camera system 10 includes a camera body 1100 as an image-capturing apparatus and an interchangeable lens 1200 as a lens apparatus (or an accessory apparatus) detachably attachable to the camera body 1100.

As illustrated in FIG. 11, the interchangeable lens 1200 is detachably attached to the camera body 1100 via a lens mount 12. The interchangeable lens 1200 is provided with an image-capturing optical system including a focus lens 1201, a zoom (magnification-varying) lens 1202, a stop unit (aperture) 1203 and an image-stabilizing lens 1204. Although FIG. 11 illustrates each of the focus lens 1201, the zoom lens 1202 and the image-stabilizing lens 1204 as a single lens, each thereof may be constituted by multiple lenses. A light flux from an object (not illustrated) entering the image-capturing optical system reaches an image sensor 1102 to form an object image (optical image) on the image sensor 1102.

First, description will be made of a configuration of the camera body 1100. In the camera body 1100, a shutter 1101 controls an exposure amount of the image sensor 1102. The image sensor 1102 is constituted by a CCD sensor or a CMOS sensor and photoelectrically converts the object image into an analog image-capturing signal. The image sensor 1102 may include multiple pixels (focus detection pixels) used for focus detection. An A/D converter 1103 converts the analog image-capturing signal output from the image sensor 1102 into a digital image-capturing signal to output the digital image-capturing signal to an image processor 1140 and a memory controller 1105. An optical viewfinder 1114 and mirrors 1112 and 1113 enable a user to observe the object image when the mirror 1112 is located in an image capturing optical path from the image-capturing optical system (that is, located at a down position) as illustrated in FIG. 11. A timing generator 1104 supplies clock signals and synchronization signals to the image sensor 1102, the A/D converter 1103, the image processor 1140, the memory controller 1105 and a system controller 1130 described later.

The image processor 1140 performs predetermined image processes such as a pixel interpolation process and a color conversion process on the digital image-capturing signal from the A/D converter 1103 or on data from the memory controller 1105 to produce image data. The image processor 1140 performs a predetermined calculation process using the produced image data. The image processor 1140 determines a position of the object (object image) in the image data and follows the object by using its color and shape. The image processor 1140 further includes a motion vector detector 1141. The motion vector detector 1141 detects, in a first time period, a motion vector (motion vector amount) by using the positions of the object over multiple frames in the image data (video data). The position of the object includes upper left coordinates of the object, a height and a width thereof. The result of the calculation performed by the image processor 1140 is output to the system controller 1130 via the memory controller 1105.

The memory controller 1105 controls the A/D converter 1103, the timing generator 1104, the image processor 1140, a memory 1107, a recorder 1108 and an image display unit 1106. The image data output from the image processor 1140 is written, through the memory controller 1105, to the memory 1107 and the recorder 1108. The memory 1107 and the recorder 1108 each store the image data as the video data or a still image data. The memory 1107 is constituted by a volatile memory and used as a work area for the system controller 1130. The recorder 1108 is constituted by a non-volatile memory provided inside or detachably attached to the camera body 1100 and is used as an image recording area.

The image display unit 1106 is constituted by an LCD or the like and is used as an electronic viewfinder (EFV) that displays a video image or a still image corresponding to the image data produced by the image processor 1140 or recorded in the recorder 1108. A shutter controller 1110 controls, with a mirror controller 1111, the shutter 1101 in response to a control signal from the system controller 1130. The mirror controller 1111 controls down (insertion) and up (retraction) operations of the mirror 1112 with respect to an image-capturing optical path in response to the control signal from the system controller 1130.

The system controller 1130 controls the entire camera system 10 including the camera body 1100 and the interchangeable lens 1200 in response to input signals from a first shutter switch (SW1) 1115, a second shutter switch (SW2) 1116, a camera operation unit 1117 and the memory controller 1105. That is, the system controller 1130 controls, in response to the input signals, the image sensor 1102, the memory controller 1105, the shutter controller 1110 and the mirror controller 1111 in the camera body 1100 and further controls the interchangeable lens 1200 via a camera I/F 1120.

The first shutter switch (SW1) 1115 operated by the user instructs, to the system controller 1130, a start of operations such as an AF process, an AE process and an AWB process. The second shutter switch (SW2) 1116 operated by the user instructs a start of an exposure operation to the system controller 1130. The system controller 1130 having received the exposure start instruction controls the mirror controller 1111, the shutter controller 1110 and the memory controller 1105 and controls the interchangeable lens 1200 via the camera I/F 1120 to start the exposure operation, that is, an image-capturing operation of the image sensor 1102 and an image recording operation of the recorder 1108. The system controller 1130 ends the image-capturing operation of the image sensor 1102 in response to an elapse of a predetermined exposure time.

Then, the system controller 1130 causes the A/D converter 1103 to convert the analog image-capturing signal output from the image sensor 1102 into the digital image-capturing signal, causes the image processor 1140 to produce the image data as a still image data and causes the memory controller 1105 to store the still image data. The memory controller 1105 stores the still image data with an image capturing condition for capturing the still image data and a result of a follow shot assist process (hereinafter referred to as "follow shot assisted result") when the follow shot assist process is performed. Thereafter, the system controller 1130 causes the memory controller 1105 to store the still image data to the recorder 1108 as compressed image data or RAW image data. The image-capturing condition and the follow shot assisted result are recorded as EXIF information in the still image data.

The camera operation unit 1117 includes operation members such as a power-on/off button, other buttons and a touch panel and outputs instructions corresponding to user's operations for the respective operation members to the system controller 1130. The system controller 1130 performs, in response to the instructions from the camera operation unit 1117, switching of operation modes provided in the camera body 1100 such as an AF mode, an AE mode and a follow shot assist mode. The camera power controller 1118 manages an external battery and a built-in battery provided to the camera body 1100. The camera power controller 1118 performs, when the battery is removed or a remaining battery level becomes zero, a forced shut-down process of the operations of the camera body 1100. The system controller 1130 shuts down power supply to the interchangeable lens 1200 in response to the forced shut-down process.

An AF controller 1131 included in the system controller 1130 controls the AF process. In the AF process, the AF controller 1131 calculates, according to a user-selected AF mode, a drive amount of the focus lens 1201 depending on lens information acquired from the interchangeable lens 1200 via the camera I/F 1120, such as a position of the focus lens 1201 and a focal length of the image-capturing optical system, and on an AF evaluation value described later. The AF controller 1131 transmits the drive amount of the focus lens 1201 to the interchangeable lens 1200 via a communication controller 1133 included in the system controller 1130 and the camera I/F 1120. When the AF mode is a phase difference AF mode or an imaging-surface phase difference AF mode, the AF controller 1131 calculates, as the AF evaluation value, a phase difference of paired object images formed on a focus detection sensor via the mirror 1112 and a sub mirror (not illustrated) or on the focus detection pixels of the image sensor 1102 and calculates the drive amount of the focus lens 1201 from the phase difference. On the other hand, when the AF mode is a contrast AF mode, the AF controller 1131 calculates the drive amount of the focus lens 1201 by using, as the AF evaluation value, a contrast evaluation value calculated from the digital image-capturing signal or the video data by the image processor 1140. The AF controller 1131 switches, in response to a user-selected one of AF evaluation modes such as a single-point AF mode, a multipoint AF mode and a face detection AF mode, a position of an AF frame where the AF evaluation value is calculated in an image-capturing area.

The AE controller 1132 included in the system controller 1130 controls the AE process. In the AE process, the AE controller 1132 calculates, according to a user-selected image-capturing mode (AE mode), an AE control amount (including a stop control amount, a shutter speed and an exposure sensitivity) by using the lens information such as a full-open F-number and the focal length acquired from the interchangeable lens 1200 via the camera I/F 1120 and an AE evaluation value.

The AE controller 1132 transmits the stop control amount to the interchangeable lens 1200 via the communication controller 1133 and the camera I/F 1120.

The AE controller 1132 inputs the shutter speed to the shutter controller 1110 and inputs the exposure sensitivity to the image sensor 1102. When the image-capturing mode is a viewfinder image-capturing mode, the AE controller 1132 calculates the AE control amount depending on an AE evaluation value acquired from a luminance detector (not illustrated) that detects a luminance of the object image formed thereon via the mirrors 1112 and 1113. On the other hand, when the image-capturing mode is a live-view image-capturing mode, the AE controller 1132 calculates the AE control amount depending on an AE evaluation value calculated by the image processor 1140. The AE controller 1132 further switches, according to a user-selected one of photometry modes such as an evaluation photometry mode, an averaging photometry mode and a face detection photometry mode, a position of an AE frame where the AE evaluation value is calculated and a weighting amount applied thereon.

A follow shot assist controller (calculator) 1134 included in the system controller 1130 controls the follow shot assist process. The follow shot assist process is performed in the live-view image-capturing mode and can be performed only when the interchangeable lens 1200 is compatible with the follow shot assist process. When the interchangeable lens 1200 is not compatible with the follow shot assist process, the follow shot assist controller 1134 controls only an image flow amount in the follow shot assist mode. Specifically, the follow shot assist controller 1134 calculates, from an angular velocity (hereinafter referred to as "a lens angular velocity") detected by an angular velocity detector 1208 included in the interchangeable lens 1200, a shutter speed for limiting an image blur amount during the exposure to a predetermined amount and provides the shutter speed to the AE controller 1132, thereby controlling the image flow amount. When the camera body 1100 includes an angular velocity detector, the angular velocity can be acquired by using this angular velocity detector.

On the other hand, when the interchangeable lens 1200 is compatible with the follow shot assist process, in the follow shot assist mode the follow shot assist controller 1134 requests the interchangeable lens 1200 to perform an operation for the follow shot assist process via the camera I/F 1120. The follow shot assist controller 1134 further calculates, using the lens angular velocity and the lens information such as the focal length acquired from the interchangeable lens 1200 via the camera I/F 1120 and the motion vector amount input from the motion vector detector 1141 in the image processor 140, an angular velocity of an object (hereinafter referred to as "object angular velocity"). In this embodiment, the object angular velocity includes not only the angular velocity, but also an angular acceleration rate of the object.

Furthermore, the follow shot assist controller 1134 calculates, using a frame rate and the shutter speed, a setting value of a lens angular velocity detection time period such that the lens angular velocity detection time period is identical (corresponds) to a motion vector detection time period as the above-mentioned first time period. The object angular velocity and the setting value of the lens angular velocity detection time period are transmitted to the interchangeable lens 1200 via the communication controller 1133 and the camera I/F 1120. The setting value of the lens angular velocity detection time period is provided with an ID. This ID (hereinafter referred to as "a first detection time period ID") as a first ID information is added to the lens angular velocity detection time period so as to enable the follow shot assist controller 1134 to determine which lens angular velocity detection time period the lens angular velocity to be acquired from the interchangeable lens 1200 is detected in. Therefore, the lens angular velocity is also provided with an ID (hereinafter referred to as "a second detection time period ID") as second ID information. The lens angular velocity is transmitted from the interchangeable lens 1200 to the camera body 1100 in relation with the second detection time period ID.

The follow shot assist controller 1134 allocates, to the motion vector detection time period as the first time period, a detection time period ID (hereinafter referred to as "a motion vector detection time period ID") identical to the first detection time period ID. The follow shot assist controller 1134 stores the motion vector (amount) detected in that motion vector detection time period and the allocated motion vector detection time period ID" in relation to each other to an internal memory (not illustrated) in the system controller 1130 or the memory 1107. As described above, the follow shot assist controller 1134 adds the first detection time period ID to the lens angular velocity detection time period set so at to be identical to the motion vector detection time period and adds the motion vector detection time period ID identical to the first detection time period ID to the motion vector detection time period. Then, the follow shot assist controller 1134 transmits the object angular velocity, the setting value of the lens angular velocity detection time period and the first detection time period ID to the interchangeable lens 1200.

The lens controller 1210 in the interchangeable lens 1200 stores the first detection time period ID received from the camera body 1100 in relation with the lens angular velocity detected in the lens angular velocity detection time period received from the camera body 1100 as angular velocity information to an internal memory (not illustrated) in the lens controller 1210 or a memory 1212. The lens controller 1210 transmits, in response to a request from the camera body 1100, the lens angular velocity with the second detection time period ID to the camera body 1100.

The follow shot assist controller 1134 in the camera body 1100 compares the motion vector detection time period ID (that is, the detection time period ID) related to the motion vector with the second detection time period ID related to the lens angular velocity received from the interchangeable lens 1200. The follow shot assist controller 1134 determines, depending on whether or not the first and second detection time periods ID are identical to each other, whether or not the communication with the interchangeable lens 1200 has been performed at an expected time.

The communication controller 1133 in the system controller 1130 in the camera body 1100 controls a communication process between the camera body 1100 and the interchangeable lens 1200. In response to detecting that the interchangeable lens 1200 is attached to the camera body 1100 through the camera I/F 1120, the communication controller 1133 starts the communication between the camera body 1100 and the interchangeable lens 1200 to receive the lens information and transmit the camera information and various drive commands. For example, when the image-capturing mode is set to the live-view image-capturing mode and the interchangeable lens 1200 is compatible with the follow shot assist process, the communication controller 1133 performs, in response to an input of an image-capturing synchronization signal from the timing generator, a synchronization signal communication for notifying of a communication start delay time from the input of the image-capturing synchronization signal until the communication is started. When the exposure started in response to the user's operation of the second shutter switch (SW2) 1116, the communication controller 1133 receives information on the follow shot assisted result from the interchangeable lens 1200. In the live-view image-capturing mode, in response to an input of the image-capturing synchronization signal from the timing generator 1104, the communication controller 1133 collectively receives the lens information including the position of the focus lens 1201, a stop state (F-number) of the stop unit 1203, the focal length and others.

The camera I/F 1120 is an interface for the communication between the camera body 1100 and the interchangeable lens 1200. The camera I/F 1120 enables the system controller 1130 in the camera body 1100 to communicate with the lens controller 1210 in the interchangeable lens 1200 by using electric signals via a connector 20 and the communication controller 1133, thereby enabling transmitting and receiving the control commands and lens information between the system controller 1130 and the lens controller 1210.

Next, description will be made of a configuration of the interchangeable lens 1200. The focus lens 1201 is moved in an optical axis direction along an optical axis OA to change a focus state of the image-capturing optical system. A focus controller 1205 is controlled by the lens controller 1210 to drive the focus lens 1201. The focus controller 1205 outputs focus information such as the position of the focus lens 1201 to the lens controller 1210.

A zoom lens 1202 is moved in the optical axis direction to change the focal length of the image-capturing optical system. A zoom controller 1206 is controlled by the lens controller 1201 to drive the zoom lens 1202. The zoom controller 1206 outputs zoom information such as the focal length to the lens controller 1210. The stop unit 1203 has a variable aperture diameter (F-number) that changes an amount of light passing therethrough. A stop controller 1207 is controlled by the lens controller 1210 to drive the stop unit 1203. The stop controller 1207 outputs stop information such as the F-number to the lens controller 1210.

An image-stabilizing lens 1204 is moved in a direction orthogonal to the optical axis OA to reduce image blur caused by camera shaking due to user's hand jiggling or the like. An image-stabilization controller 1209 is controlled by the lens controller 1210 to drive the image-stabilizing lens 1204. The image-stabilization controller 1209 outputs image-stabilization information such as an image-stabilization range to the lens controller 1210.

The angular velocity detector 1208 detects lens angular velocities of the interchangeable lens 1200 in a yaw direction and a pitch direction to output the detected lens angular velocities to the lens controller 1210. The angular velocity detector 1208 is controlled by the lens controller 1210. The angular velocity detector may be provided to the camera body 1100.

A lens operation unit 1211 includes a focus operation ring, a zoom operation ring, an AF/MF switch and an IS (image-stabilization)-on/off switch and outputs instructions depending on user's operations thereof to the lens controller 1210. The lens controller 1210 switches, in response to the user's operations of the lens operation unit 1211, operation modes of various functions provided in the interchangeable lens 1200. The memory 1212 is constituted by a volatile memory.

The lens controller 1210 controls, in response to input signals from the lens operation unit 1211 and a lens I/F 1220, the focus controller 1205, the zoom controller 1206, the stop controller 1207, the image-stabilization controller 1209 and the angular velocity detector 1208. Thus, the lens controller 1210 controls the entire interchangeable lens 1200. In addition, the lens controller 1210 transmits, in response to receiving lens information requests from the camera body 1100 via the lens I/F 1220, the lens information input from the other controllers 1205 to 1207 and 1209 and the lens angular velocity detected by the angular velocity detector 1208 to the camera body 1100 via the lens I/F 1220.

The lens I/F 1220 is an interface for the communication between the interchangeable lens 1200 and the camera body 1100. The lens I/F 1220 enables the lens controller 1210 in the interchangeable lens 1200 to communicate with the system controller 1130 in the camera body 1100 by using electric signals via the connector 20, thereby enabling transmitting and receiving the lens information and the control commands between the lens controller 1210 and the system controller 1130.

Figure 12:
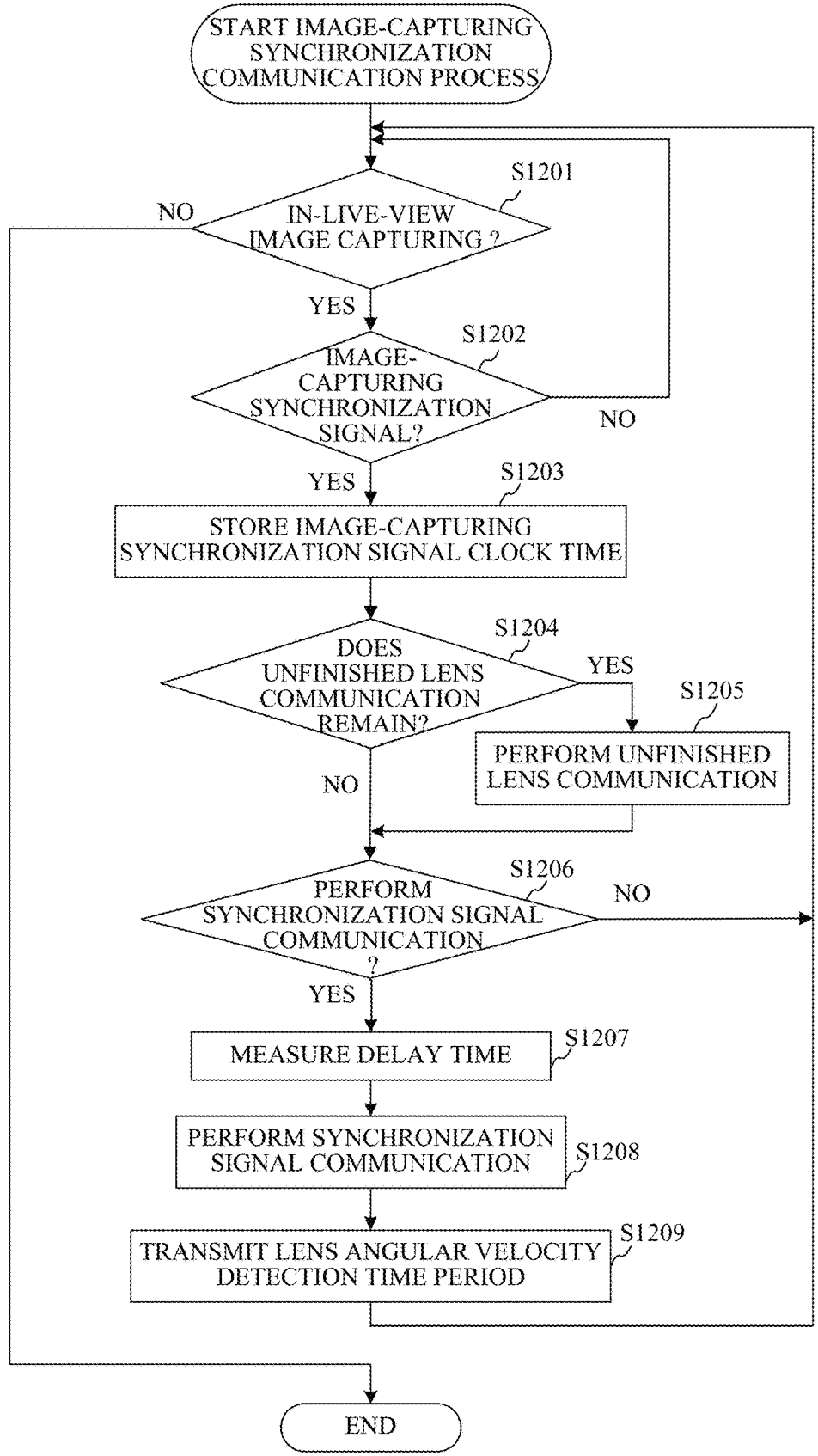
FIG. 12 is a flowchart illustrating an image-capturing synchronous communication process performed in the camera body of Embodiments 3 and 4.

Next, with reference to a flowchart of FIG. 12, description will be made of an image-capturing synchronization communication process performed by the system controller 1130 in the camera body 1100. FIG. illustrates the image-capturing synchronization communication process performed when the camera body 1100 is in the live-view image-capturing mode and the interchangeable lens 1200 attached thereto is compatible with the follow shot assist process. The system controller 1130 executes this process and other processes described later according to a camera communication control program as a computer program. The image-capturing synchronization communication process is performed in the live-view image-capturing mode (that is, a live-view image capturing is being performed) and is a process for causing the system controller 1130 to perform an image-capturing synchronization communication with the interchangeable lens 1200 at a time at which the image-capturing synchronization signal is input.

First, at step S1201, the system controller 1130 determines whether or not the live-view image capturing is currently being performed. If the live-view image capturing is being performed, the system controller 1130 proceeds to step S1202. If the live-view image capturing is not being performed, the system controller 1130 ends this image-capturing synchronization communication process.

At step S1202, the system controller 1130 determines whether or not the image-capturing synchronization signal is input.

If the image-capturing synchronization signal is input, the system controller 1130 proceeds to step S1203. If the image-capturing synchronization signal is not input, the system controller 1130 returns to step S1201.

At step S1203, the system controller 1130 stores a time point at which the image-capturing synchronization signal is input as an image-capturing synchronization signal time point to the internal memory (not illustrated) in the system controller 1130 or the memory 1107.

Next, at step S1204, the system controller 1130 determines whether or not an unfinished lens communication remains. If the unfinished lens communication remains, the system controller 1130 proceeds to step S1205. If the unfinished lens communication does not remain, the system controller 1130 proceeds to step S1206.

At step S1205, the system controller 1130 performs the unfinished lens communication and then proceeds to step S1206.

At step S1206, the system controller 1130 determines whether or not to perform the synchronization signal communication. When the interchangeable lens 1200 is compatible with the follow shot assist process and the follow shot assist mode is set, the system controller 1130 determines to perform the synchronization signal communication and proceeds to step S1207. On the other hand, when determining not to perform the synchronization signal communication, the system controller 1130 returns to step S1201.

At step S1207, the system controller 1130 measures an elapsed time from the image-capturing synchronization signal time point and stores this elapsed time as a delay time (hereinafter referred to as "a synchronization signal communication delay time") to the internal memory or the memory 1107.

Next, at step S1208, the system controller 1130 performs the synchronization signal communication to the interchangeable lens 1200 via the camera I/F 1120. The synchronization signal communication transmits data (transmission data) including the synchronization signal communication delay time.

Next, at step S1209, the system controller 1130 performs a setting value communication for transmitting the lens angular velocity detection time period (lens angular velocity detection time period receiving process) to the interchangeable lens 1200 via the camera I/F 1120 and then returns to step S1201. The system controller 1130 transmits, as transmission data of the setting value communication, the above-described setting value of the lens angular velocity detection time period input from the follow shot assist controller 1134. As described above, the setting value of the lens angular velocity detection time period includes the first detection time period ID output from the follow shot assist controller 1134.

The image-capturing synchronization communication process described above enables the camera body 1100 to notify the interchangeable lens 1200 of the image-capturing synchronization signal and enables the camera body 1100 to set the lens angular velocity detection time period.

Figure 13:
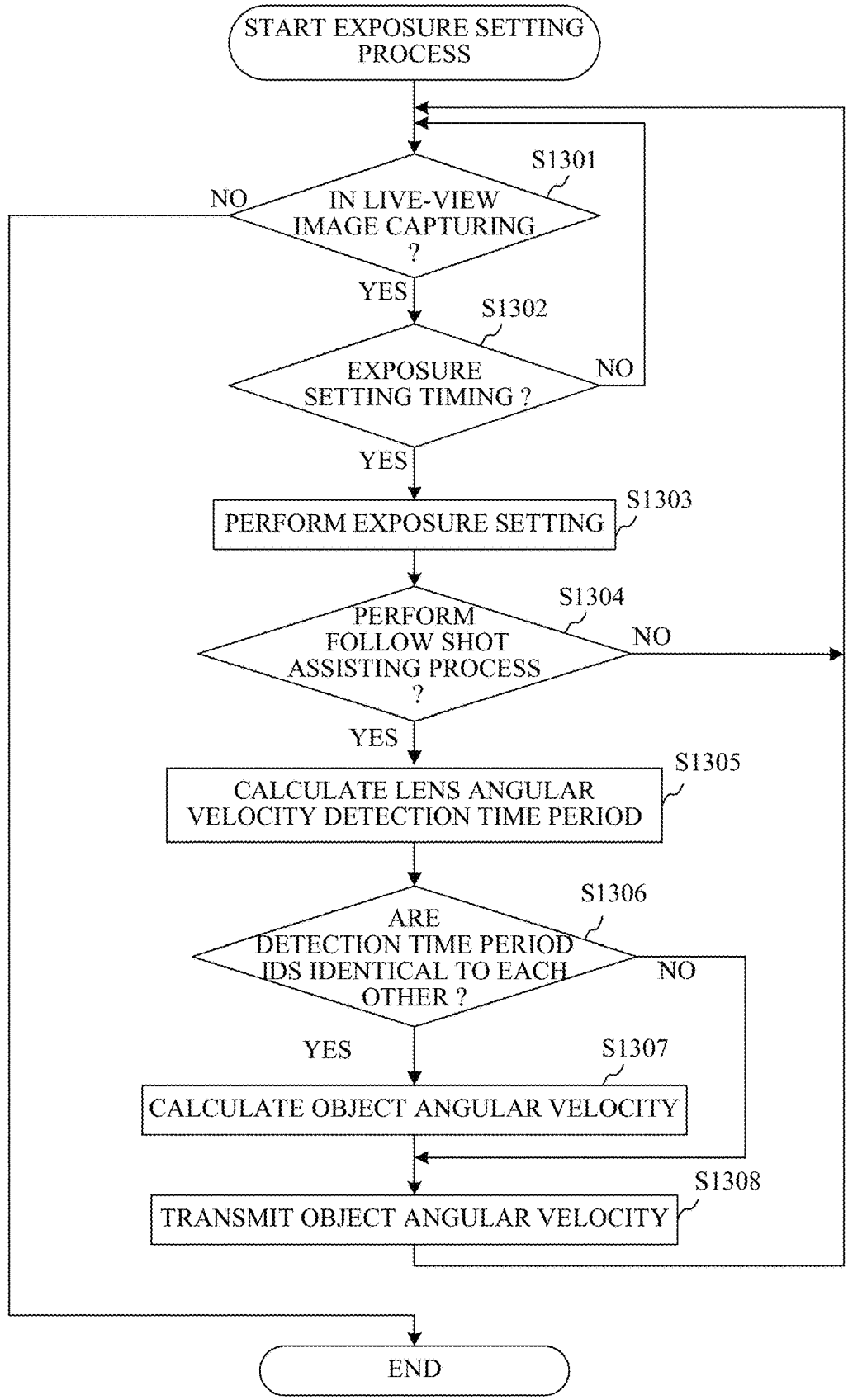
FIG. 13 is a flowchart illustrating an exposure setting process performed in the camera body of Embodiments 3 and 4.

Next, with reference to a flowchart of FIG. 13, description will be made of an exposure setting process performed by the system controller 1130 and the follow shot assist controller 1134 in the camera body 1100. FIG. 13 illustrates the exposure setting process performed when the camera body 1100 is in the live-view image-capturing mode and the interchangeable lens 1200 attached thereto is compatible with the follow shot assist process. The exposure setting process is performed for every frame in the live-view image-image capturing mode in order to perform an exposure control for a next frame.

First, at step S1301, the system controller 1130 determines whether or not the live-view image capturing is being performed. If the live-view image capturing is being performed, the system controller 1130 proceeds to step S1302. If the live-view image capturing is not being performed, the system controller 1130 ends this exposure setting process.

At step S1302, the system controller 1130 determines whether or not an exposure setting time of the image sensor 1102 for the next frame has come. If the exposure setting time has come, the system controller 1130 proceeds to step S1303. If the exposure setting time has not yet come, the system controller 1130 returns to step S1301.

At step S1303, the system controller 1130 calculates an exposure setting value depending on the AE control amount and the set image-capturing mode. The system controller 1130 further outputs the exposure setting value to the memory controller 1105 to perform the exposure control for the next frame.

Next, at step S1304, the system controller 1130 causes the follow shot assist controller 1134 to determine whether or not to perform the follow shot assist process. When the interchangeable lens 1200 is compatible with the follow shot assist process and the follow shot assist mode is set, the follow shot assist controller 1134 determines to perform the follow shot assist process and then proceeds to step S1305. On the other hand, when determining not to perform the follow shot assist process, the system controller 1130 returns to step S1301.

At step S1305, the follow shot assist controller 1134 calculates, depending on the exposure setting value for the next frame and others, the setting value of the lens angular velocity detection time period such that the lens angular velocity detection time period is identical (corresponds) to the motion vector detection time period, as a relative time from the image-capturing synchronization signal time point. The calculated setting value of the lens angular velocity detection time period is transmitted at step S1209 described above to the interchangeable lens 1200. The setting value of the lens angular velocity detection time period includes the first detection time period ID.

As described above, the first detection time period ID is added to the lens angular velocity detection time period so as to enable the follow shot assist controller 1134 to determine which lens angular velocity detection time period the lens angular velocity acquired from the interchangeable lens 1200 is detected in. Therefore, the lens angular velocity is also provided with the second detection time period ID and is transmitted to the camera body 1100 in relation with the second detection time period ID.

Next, as step S1306, the follow shot assist controller 1134 determines whether or not the motion vector detection time period ID (that is, the first detection time period ID) corresponding to the motion vector to be used is identical to the second detection time period ID corresponding to the lens angular velocity received from the interchangeable lens 1200. If these IDs are identical to each other, the follow shot assist controller 1134 proceeds to step S1307. If these IDs are not identical to each other, the follow shot assist controller 1134 proceeds to step S1308.

At step S1307, the follow shot assist controller 1134 calculates the object angular velocity using the lens angular velocity and the lens information such as the focal length received from the interchangeable lens 1200 and on the motion vector amount input from the image processor 1140 (motion vector detector 1141). As described above, the object angular velocity includes not only the angular velocity but also the angular acceleration rate. The follow shot assist controller 1134 further inputs the calculated object angular velocity to the communication controller 1133. The object angular velocity is provided with an angular velocity acquisition time point corresponding to the lens angular velocity used for calculating the object angular velocity.

At step S1308, the communication controller 1133 performs an object angular velocity communication in order to transmit the object angular velocity with the first detection time period ID to the interchangeable lens 1200 and then returns to step S1301.

The above-described exposure setting process enables the camera body 1100 to perform the exposure control for the next frame and to set the lens angular velocity detection time period to be notified to the interchangeable lens 1200 in response to a next image-capturing synchronization signal. Furthermore, the exposure setting process enables the camera body 1100 to transmit the object angular velocity to the interchangeable lens 1200 and to receive the lens angular velocity from the interchangeable lens 1200.

Figure 14:
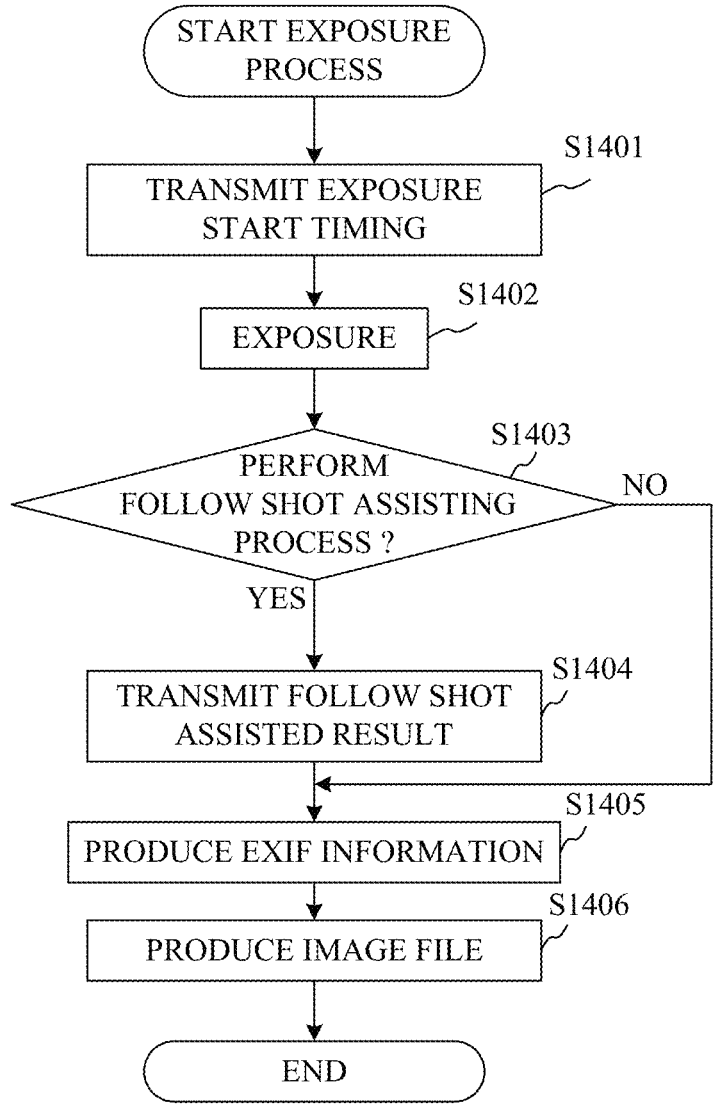
FIG. 14 is a flowchart illustrating an exposure process performed in the camera body of Embodiments 3 and 4.

Next, with reference to a flowchart of FIG. 14, description will be made of an exposure process performed by the system controller 1130 and the follow shot assist controller 1134 in the camera body 1100. FIG. 14 illustrates a live-view exposure process when the camera body 1100 is in the live-view image-capturing mode and the interchangeable lens 1200 attached thereto is compatible with the follow shot assist process. The live-view exposure process is started in response to the exposure start instruction (image-capturing start instruction) from the second shutter switch (SW2) 1116 in the live-view image-image capturing mode.

First, at step S1401, the system controller 1130 notifies the interchangeable lens 1200 that it is an exposure start time (image-capturing start time) through communication therewith via the communication controller 1133.

Next, at step S1402, the system controller 1130 controls the shutter controller 1110 and the image sensor 1102 so as to perform the exposure process to acquire image data. The acquired image date is stored to the memory 1107 through the image processor 1140 and the memory controller 1105.

Next, at step S1403, the system controller 1130 causes the follow shot assist controller 1134 to determine whether or not to perform the follow shot assist process. When the interchangeable lens 1200 is compatible with the follow shot assist process and the follow shot assist mode is set, the follow shot assist controller 1134 determines to perform the follow shot assist process and then proceeds to step S1404. On the other hand, when determining not to perform the follow shot assist process, the system controller 1130 proceeds to step S1405.

At step S1404, the follow shot assist controller 1134 performs communication for receiving the follow shot assisted result from the interchangeable lens 1200 via the communication controller 1133. The follow shot assist controller 1134 thereby acquires, as the follow shot assisted result, an image-stabilized result in the exposure process performed using the object angular velocity. Then, the follow shot assist controller 1134 proceeds to step S1405.

At step S1405, the system controller 1130 produces EXIF information to be included in an image file. The EXIF information is stored to the memory 1107 via the memory controller 105. In this embodiment, the EXIF information includes, in addition to the image-capturing condition including the image-capturing mode, the focal length, the shutter speed and the F-number, the follow shot assisted result received at step S1404.

Next, at step S1406, the system controller 1130 controls the image processor 1140 to cause it to produce the image file from the image data and the EXIF information. The system controller 1130 further stores the image file to the memory 1107 via the memory controller 1105 and then records the image file to the recorder 1108.

The above-described exposure process enables the camera body 1100 to acquire the result of the follow shot assist process performed in the exposure process from the interchangeable lens 1200 and to add that follow shot assisted result to the image data or to display the follow shot assisted result on the image display unit 1106.

Figure 15:
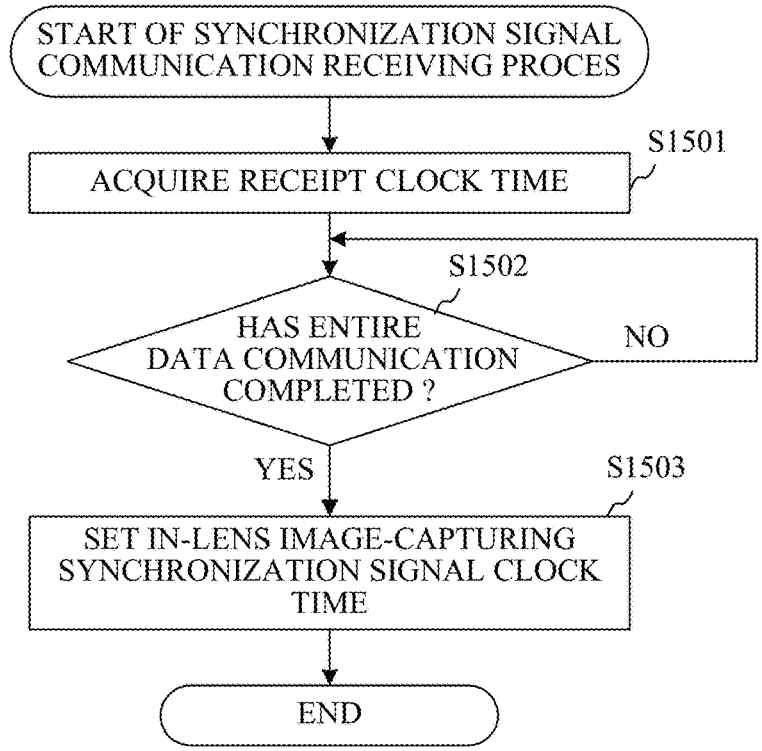
FIG. 15 is a flowchart illustrating a synchronization signal communication receiving process in the interchangeable lens of Embodiments 3 and 4.

Next, with reference to a flowchart of FIG. 15, description will be made of a synchronization signal communication receiving process performed by the lens controller 1210 in the interchangeable lens 1200 for receiving the synchronization signal communication from the camera body 1100. FIG. 15 illustrates the synchronization signal communication receiving process performed when the camera body 1100 is in the live-view image-capturing mode and the interchangeable lens 1200 attached thereto is compatible with the follow shot assist process. This process is started in the interchangeable lens 1200 in response to receiving the synchronization signal communication from the camera body 1100. The system controller 1130 executes this process and other processes described later according to a lens communication control program as a computer program.

First, at step S1501, the lens controller 1210 acquires a current time point of a free-run timer used for time management in the interchangeable lens 1200 to store a time point at which the synchronization signal communication is performed (this time point is hereinafter referred to as "a synchronization signal communication time point"). The synchronization signal communication time point is stored to an internal memory in the lens controller 1210 or the memory 1212.

Next, at step S1502, the lens controller 1210 determines whether or not a predetermined communication data length of the synchronization signal communication has been communicated, that is, whether or not the entire data communication (transmission and receipt) has been completed. If the entire data communication has not yet been completed, the lens controller 1210 repeats step S1502 until the entire data communication is completed. On the other hand, if the entire data communication has been completed, the lens controller 1210 proceeds to step S1503.

At step S1503, the lens controller 1210 subtracts the synchronization signal communication delay time included in the received data of the synchronization signal communication from the synchronization signal communication time point stored at step S1501. This subtraction provides (sets) an in-lens image-capturing synchronization signal time point (that is, a time point of the image-capturing synchronization signal in the interchangeable lens 1200) identical to the image-capturing synchronization signal time point in the camera body 1100.

The above-described synchronization signal communication receiving process enables the interchangeable lens 1200 to acquire the in-lens image-capturing synchronization signal time point identical to the image-capturing synchronization signal time point in the camera body 1100.

Figure 16:
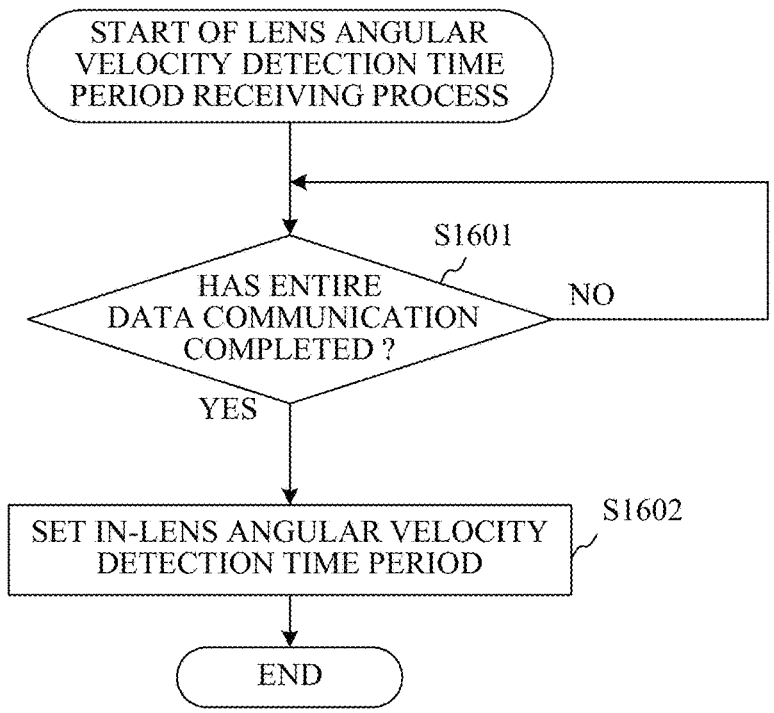
FIG. 16 is a flowchart illustrating a lens angular velocity detection time period receiving process in the interchangeable lens of Embodiments 3 and 4.

Next, with reference to a flowchart of FIG. 16, description will be made of the above-mentioned lens angular velocity detection time period receiving process performed by the lens controller 1210 in the interchangeable lens 1200 for receiving the setting value communication of the lens angular velocity detection time period from the camera body 1100. FIG. 16 illustrates the lens angular velocity detection time period receiving process performed when the camera body 1100 is in the live-view image-capturing mode and the interchangeable lens 1200 attached thereto is compatible with the follow shot assist process. This process is started in the interchangeable lens 1200 in response to receiving the setting value communication of the lens angular velocity detection time period from the camera body 1100.

First, at step S1601, the lens controller 1210 determines whether or not a predetermined communication data length of the setting value communication of the lens angular velocity detection time period has been communicated, that is, whether or not the entire data communication (transmission and receipt) has been completed. If the entire data communication has not yet been completed, the lens controller 1210 repeats step S1601 until the entire data communication is completed. On the other hand, if the entire data communication has been completed, the lens controller 1210 proceeds to step S1602.

At step S1602, the lens controller 1210 sets an in-lens angular velocity detection time period depending on the setting value of the lens angular velocity detection time period included in the received data of the setting value communication performed at step S1601, and on the in-lens image-capturing synchronization signal time point calculated at step S1503 in FIG. 15. The lens controller 1210 further acquires, from the angular velocity detector 1208, the lens angular velocity in the in-lens angular velocity detection time period. Then, the lens controller 1210 adds the first detection time period ID included in the received data of the setting value communication performed at step S1601, and the angular velocity acquisition time point received in the object angular velocity communication to the acquired lens angular velocity, and stores these data to the internal memory or the memory 1212. The lens controller 1210 is desirable to store that the follow shot assist process is active to the memory 1212.

The above-described lens angular velocity detection time period receiving process enables the interchangeable lens 1200 to set the in-lens angular velocity detection time period identical to the motion vector detection time period in the camera body 1100.

Figure 17:
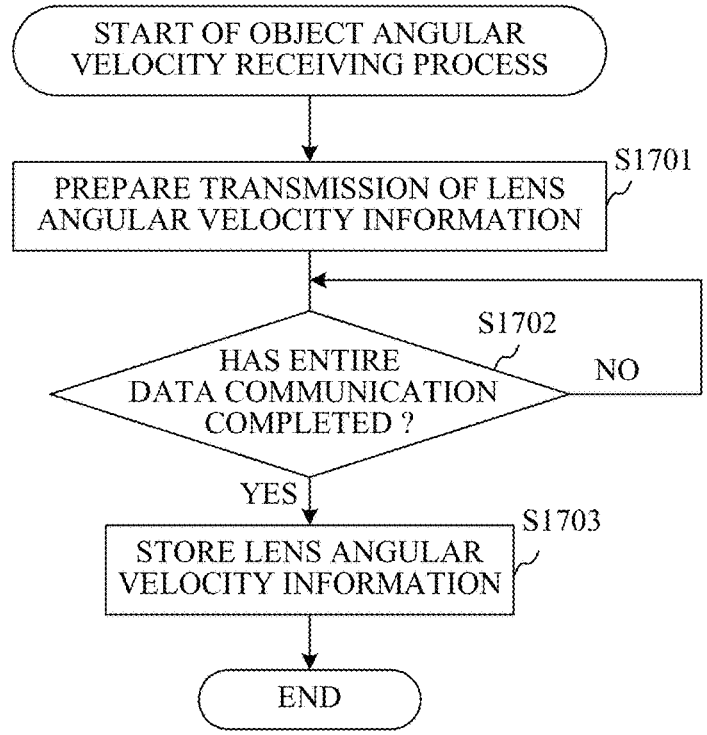
FIG. 17 is a flowchart illustrating an object angular velocity receiving process in the interchangeable lens of Embodiments 3 and 4.

Next, with reference to a flowchart of FIG. 17, description will be made of an object angular velocity receiving process performed by the lens controller 1210 in the interchangeable lens 1200 for receiving the object angular velocity from the camera body 1100. FIG. 17 illustrates the object angular velocity receiving process performed when the camera body 1100 is in the live-view image-capturing mode and the interchangeable lens 1200 attached thereto is compatible with the follow shot assist process. This process is started in the interchangeable lens 1200 in response to receiving the object angular velocity communication from the camera body 1100.

First, at step S1701, the lens controller 1210 prepares (sets) the lens angular velocity and the second detection time period ID corresponding to the first detection time period ID stored at step 1602 in FIG. 16 to a transmission buffer in order to transmit these data to the camera body 1100.

Next, at step S1702, the lens controller 1210 starts transmitting the lens angular velocity and the second detection time period ID (that is, starts the object angular velocity communication) to the camera body 1100 and determines whether or not a predetermined communication data length of the object angular velocity communication has been communicated, that is, whether or not the entire data communication (transmission and receipt) has been completed. If the entire data communication has not yet been completed, the lens controller 1210 repeats step S1702 until the entire data communication is completed. On the other hand, if the entire data communication has been completed, the lens controller 1210 proceeds to step S1703.

At step S1703, the lens controller 1210 stores the object angular velocity to the internal memory or the memory 1212 in preparation for the exposure start time.

The above-described object angular velocity receiving process enables the interchangeable lens 1200 to acquire the object angular velocity before the exposure start time in the camera body 1100.

Figure 18:
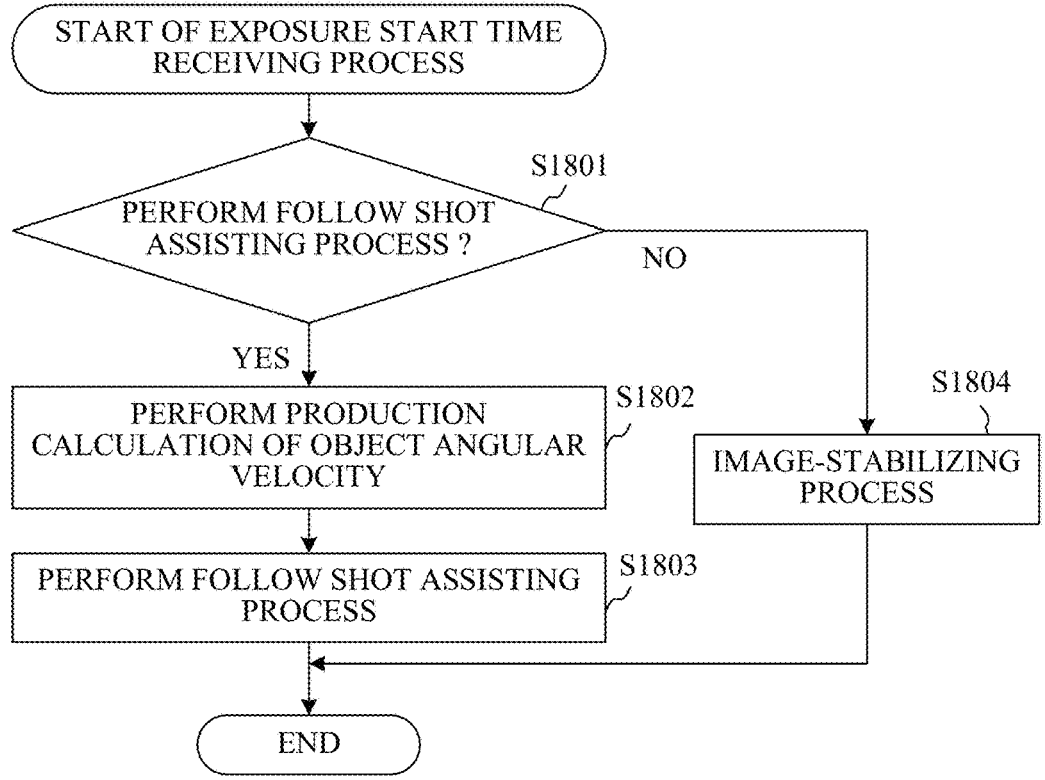
FIG. 18 is a flowchart illustrating an exposure start time receiving process in the interchangeable lens of Embodiments 3 and 4.

Next, with reference to a flowchart of FIG. 18, description will be made of an exposure start time receiving process performed by the lens controller 1210 in the interchangeable lens 1200 for receiving the exposure start time from the camera body 1100. FIG. 18 illustrates the exposure start time receiving process performed when the camera body 1100 is in the live-view image-capturing mode and the interchangeable lens 1200 attached thereto is compatible with the follow shot assist process. This process is performed in the interchangeable lens 1200 in response to receiving an exposure start time communication from the camera body 1100.

First, at step S1801, the lens controller 1210 determines whether or not the follow shot assist process is to be performed in the exposure process. For example, the lens controller 1210 determines this by referring to an area of the memory 1212 where the data is written at step S1602 in FIG. 16. If the follow shot assist process is to be performed, the lens controller 1210 proceeds to step S1802. If the follow shot assist process is not to be performed, the lens controller 1210 proceeds to step S1804.

At step S1802, the lens controller 1210 as a predictor predicts a current object angular velocity at a current time point from the object angular velocity, the angular acceleration rate of the object and the angular velocity acquisition time point stored at step S1703 in FIG. 17 and the current time point. In other words, the lens controller 1210 calculates a predicted object angular velocity before still image capturing. Specifically, when T represents the current time point, V represents the current object angular velocity to be predicted, v, a and t respectively represent the object angular velocity, the angular acceleration rate of the object and the angular velocity acquisition time point, the lens controller 1210 performs a prediction calculation expressed by the following expression (1).

$$V = v + a*(T-t) \tag{1}$$

This expression (1) for the prediction calculation is an example, and other expressions or methods may be used.

Next, at step S1803, the lens controller 1210 controls the image-stabilization controller 1209 using the current object angular velocity to perform the follow shot assist process. For example, the lens controller 1210 acquires an image-stabilization amount (panning amount) g from the angular velocity detected by the angular velocity detector 1208 and calculates a follow shot assist control amount G by using the following expression (2).

$$G = V - g \tag{2}$$

This expression (2) for calculating the follow shot assist control amount G is an example, and other expressions may be used. Controlling the image-stabilizing lens 1204 to move it in a direction opposite to and by the same amount as the follow shot assist control amount G enables acquiring a captured still image (image data) in which a moving object is still.

At step S1804, the lens controller 1210 performs an image-stabilization process using only the image-stabilization amount g from the angular velocity detector 1208 to reduce the image blur due to the user's hand jiggling.

The above-described exposure start time receiving process enables the interchangeable lens 1200 to transmit the follow shot assisted result of the follow shot assist process performed in the exposure process to the camera body 1100, and enables the camera body 1100 to record the follow shot assisted result to the acquired image data.

Next, with reference to a flowchart of FIG. 19, description will be made of a follow shot assisted result transmitting process performed by the lens controller 1210 in the interchangeable lens 1200 for transmitting the follow shot assisted result to the camera body 1100.

Figure 19:
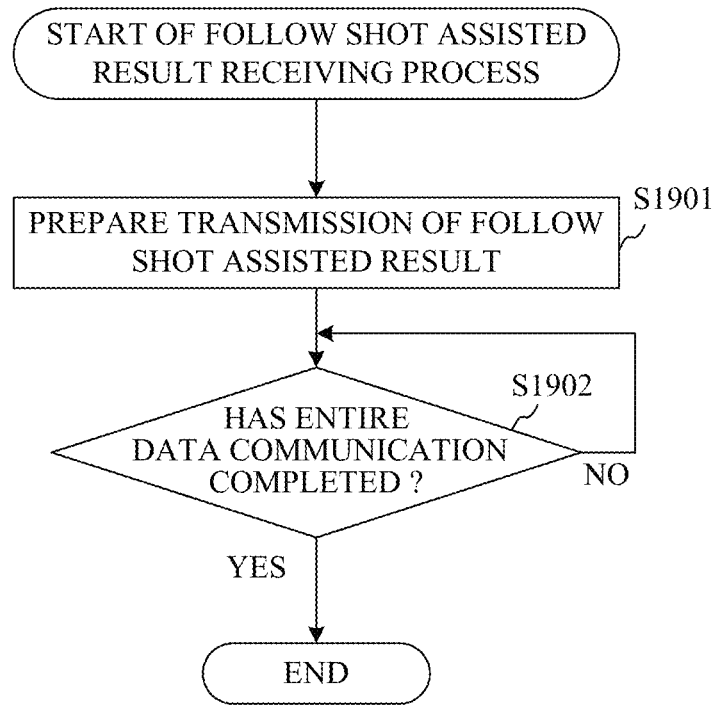
FIG. 19 is a flowchart illustrating a follow shot assisted result receiving process in the interchangeable lens of Embodiments 3 and 4.

FIG. 19 illustrates the follow shot assisted result transmitting process performed when the camera body 1100 is in the live-view image-capturing mode and the interchangeable lens 1200 attached thereto is compatible with the follow shot assist process. This process is performed in the interchangeable lens 1200 in response to receiving a follow shot assisted result request from the camera body 1100.

First, at step S1901, the lens controller 1210 prepares (sets) the follow shot assisted result such as the object angular velocity predicted at step S1802 to the transmission buffer in order to transmit the follow shot assisted result to the camera body 1100.

Next, at step S1902, the lens controller 1210 starts transmitting the follow shot assisted result to the camera body 1100 (that is, starts a follow shot assisted result communication) and determines whether or not a predetermined communication data length of the follow shot assisted result communication has been communicated, that is, whether or not the entire data communication (transmission and receipt) has been completed. If the entire data communication has not yet been completed, the lens controller 1210 repeats step S1902 until the entire data communication is completed. On the other hand, if the entire data communication has been completed, the lens controller 1210 ends this follow shot assisted result transmitting process.

The above-described follow shot assisted result time receiving process enables the interchangeable lens 1200 to transmit the follow shot assisted result to the camera body 1100.

The above-described processes enable the interchangeable lens 1200 to receive the object angular velocity to which an elapsed time from the time point of acquiring the lens angular velocity (angular velocity acquisition time point) to the start of the exposure is added, thereby achieving the follow shot assist process with higher accuracy.

Figure 20:
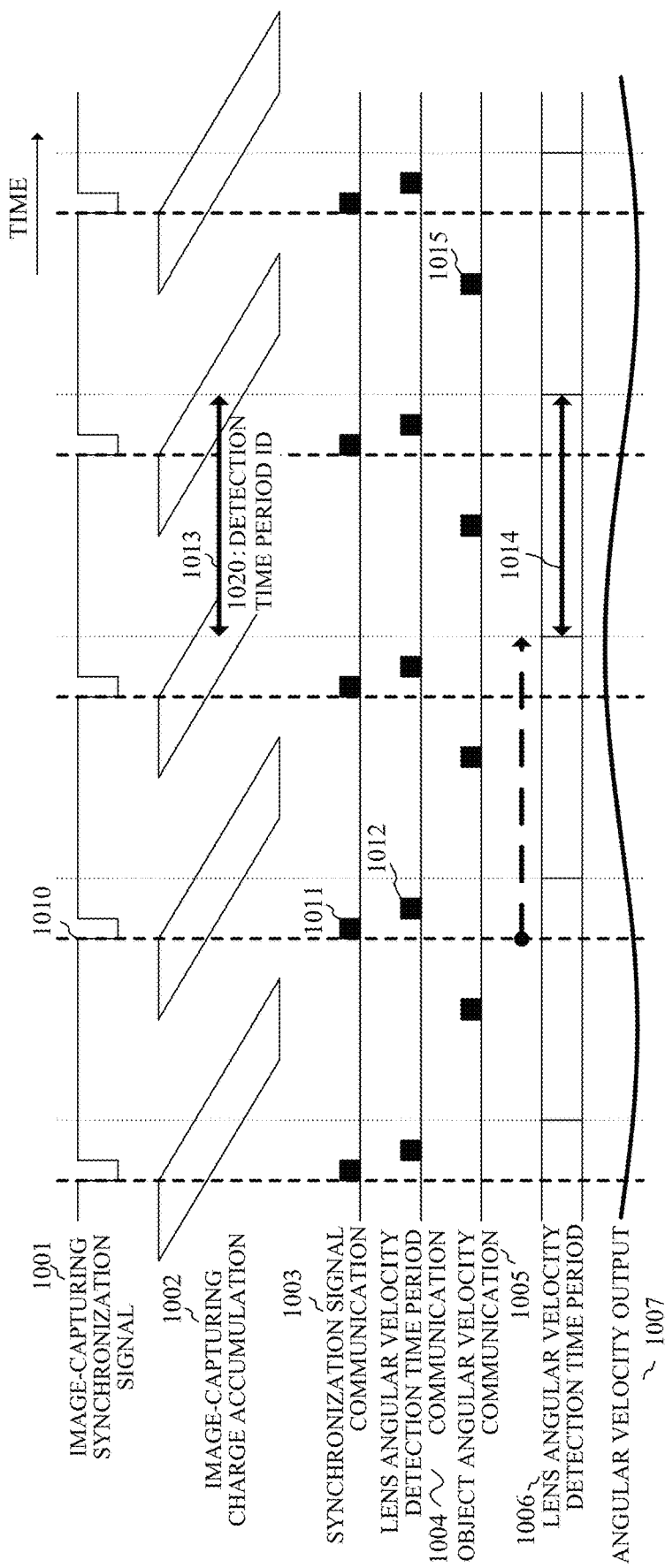
FIG. 20 is a time chart of a follow shot assist process in the camera system of Embodiments 3 and 4.

Next, with reference to a time chart of FIG. 20, description will be made of the follow shot assist process performed by the camera system 10 (the camera body 1100 and the interchangeable lens 1200). FIG. 20 illustrates process times in the follow shot assist mode when the camera body 1100 is in the live-view image-capturing mode and the interchangeable lens 1200 attached thereto is compatible with the follow shot assist process.

An image-capturing synchronization signal 1001 represents times at which the synchronization signal is output from the timing generator 1104. An image-capturing charge accumulation 1002 represents time periods in which charge accumulation of the image sensor 102 is performed. Accumulated charges in the image sensor 102 are read out from an upper part thereof in response to each of the image-capturing synchronization signal 1001. A synchronization signal communication 1003 represents times at which the synchronization signal communication is performed at step S1208 in FIG. 12. A lens angular velocity detection time period communication 1004 represents times at which the lens angular velocity detection time period communication is performed at step S1209 in FIG. 12.

An object angular velocity communication 1005 represents times at which the object angular velocity communication is performed at step S1308 in FIG. 13.

A lens angular velocity detection time period 1006 represents the lens angular velocity detection time periods set at step S1602 in FIG. 16. After the lens angular velocity detection time period ends, the lens angular velocity in that time period is calculated, and the lens angular velocity is stored with the first detection time period ID included in the setting value communication of the lens angular velocity detection time period and the angular velocity acquisition time point.

An angular velocity output 1007 represents outputs from the angular velocity detector 1208. The lens controller 1210 samples the angular velocity output 1007 in the lens angular velocity detection time period 1006. For example, when a synchronization signal communication 1011 is performed in response to the image-capturing synchronization signal 1010, the lens controller 1210 calculates the in-lens image-capturing synchronization signal time point identical (corresponding) to the time point of the image-capturing synchronization signal 1010.

Then, the lens angular velocity detection time period communication 1012 is performed. As a result, the setting value of the lens angular velocity detection time period calculated so as to be identical to a motion vector detection period (first time period) 1013 in the exposure setting process corresponding to a one previous image-capturing synchronization signal is transmitted to the interchangeable lens 1200. Furthermore, in relation with the setting value of the lens angular velocity detection time period, a motion vector detection time period ID 1020 identical to the first detection time period ID allocated to the motion vector detection time period 1013 is transmitted to the interchangeable lens 1200. This process enables the lens controller 1210 to set an in-lens angular velocity detection time period 1014. The lens angular velocity acquired by the completion of the in-lens angular velocity detection time period 1014 is transmitted by an object angular velocity communication 1015 to the camera body 1100 with the second detection time period ID identical to the first detection time period ID acquired by the lens angular velocity detection time period communication 1012. The follow shot assist controller 1134 calculates, when the first and second detection time periods ID are identical to each other, the object angular velocity by using the received lens angular velocity and the motion vector amount acquired in the motion vector detection time period 1013.

Repeating the above-described processes enables the camera body 1100 to continuously transmit accurate object angular velocities to the interchangeable lens 1200.

As described above, the image-capturing apparatus as a control apparatus of this embodiment includes the motion vector detector (1141), the calculator (follow shot assist controller 1134) and the communicator (communication controller 1133 and camera I/F 1120).

The motion vector detector is configured to detect the motion vector in the first time period (motion vector detection time period 1013). The calculator is configured to set, depending on the first time period, the angular velocity detection time period in which the angular velocity is detected by the angular velocity detector (1208). The angular velocity detection time period is identical to the first time period or a predetermined time period corresponding to the first time period. The communicator is configured to transmit the angular velocity detection time period and the first ID information corresponding to the first time period in relation to each other. The communicator is further configured to receive the angular velocity detected in the angular velocity detection time period and the second ID information corresponding to that angular velocity in relation to each other. The calculator is configured to calculate the angular velocity of the object when the first ID information and the second ID information are identical to each other, by using the motion vector detected in the first time period corresponding to the first ID information and the angular velocity corresponding to the second ID information (steps S1306 and S1307). The calculator may be configured to not calculate, when the first ID information and the second ID information are not identical to each other, the angular velocity information of the object by using the motion vector detected in the first time period corresponding to the first ID information and the angular velocity corresponding to the second ID information (step S1306).

The identity of the first ID information and the second ID information indicates that the communication (transmission and receipt) is performed with proper timing. On the other hand, a difference of the first ID information and the second ID information indicates that the communication is not performed with proper timing due to an insufficient communication band and a load increase. Thus, the camera body 1100 compares the first ID information transmitted to the interchangeable lens 1200 with the second ID information received from the interchangeable lens 1200 to determine whether or not the communication (transmission and receipt) is properly performed.

Furthermore, the lens apparatus (control apparatus) includes the communicator (lens controller 1210 and lens I/F 1220) and the angular velocity detector (1208). The communicator is configured to receive the angular velocity detection time period set depending on the first time period that is the motion vector detection time period and the first ID information corresponding to the first time period in relation to each other. The angular velocity detector is configured to detect the angular velocity in the angular velocity detection time period. The communicator is configured to transmit the detected angular velocity and the second ID information corresponding to the detected angular velocity in relation to each other. The first ID information and the second ID information are identical to each other.

In this embodiment, the camera body 1100 transmits, to the interchangeable lens 1200, the setting value of the lens angular velocity detection time period to which the first detection time period ID is added. Furthermore, the interchangeable lens 1200 transmits the lens angular velocity detected depending on the setting value of the lens angular velocity detection time period, with the second detection time period ID.

This communication enables the camera body 1100 to determine the detection time of the angular velocity, depending on the identity of the first and second detection time period IDs, which achieves a lens-interchangeable camera system having a follow shot assist function capable of accurately calculating the object angular velocity.

Embodiment 4

Next, description will be made of a fourth embodiment (Embodiment 4) of the present invention. This embodiment provides a follow shot assist function capable of further accurately calculating the object angular velocity. A basic configuration of this embodiment is the same as that of Embodiment 3, and constituent elements common to those in Embodiment 3 are denoted by the same reference numerals as those in Embodiment 3.

Embodiment 3 does not perform the object angular velocity calculation (step S1307) when the first and second detection time period IDs are not identical to each other. However, such a difference of the first and second detection time period IDs may indicate a situation that the communication with proper timing cannot be performed due to an insufficient communication band and a load increase. In such a situation, using data previously acquired (that is, past data) or reperforming the communication (that is, performing a retry process) may enable a successful object angular velocity calculation. Thus, the camera system of this embodiment performs the retry process when the first and second detection time period IDs are not identical to each other.

Figure 21:
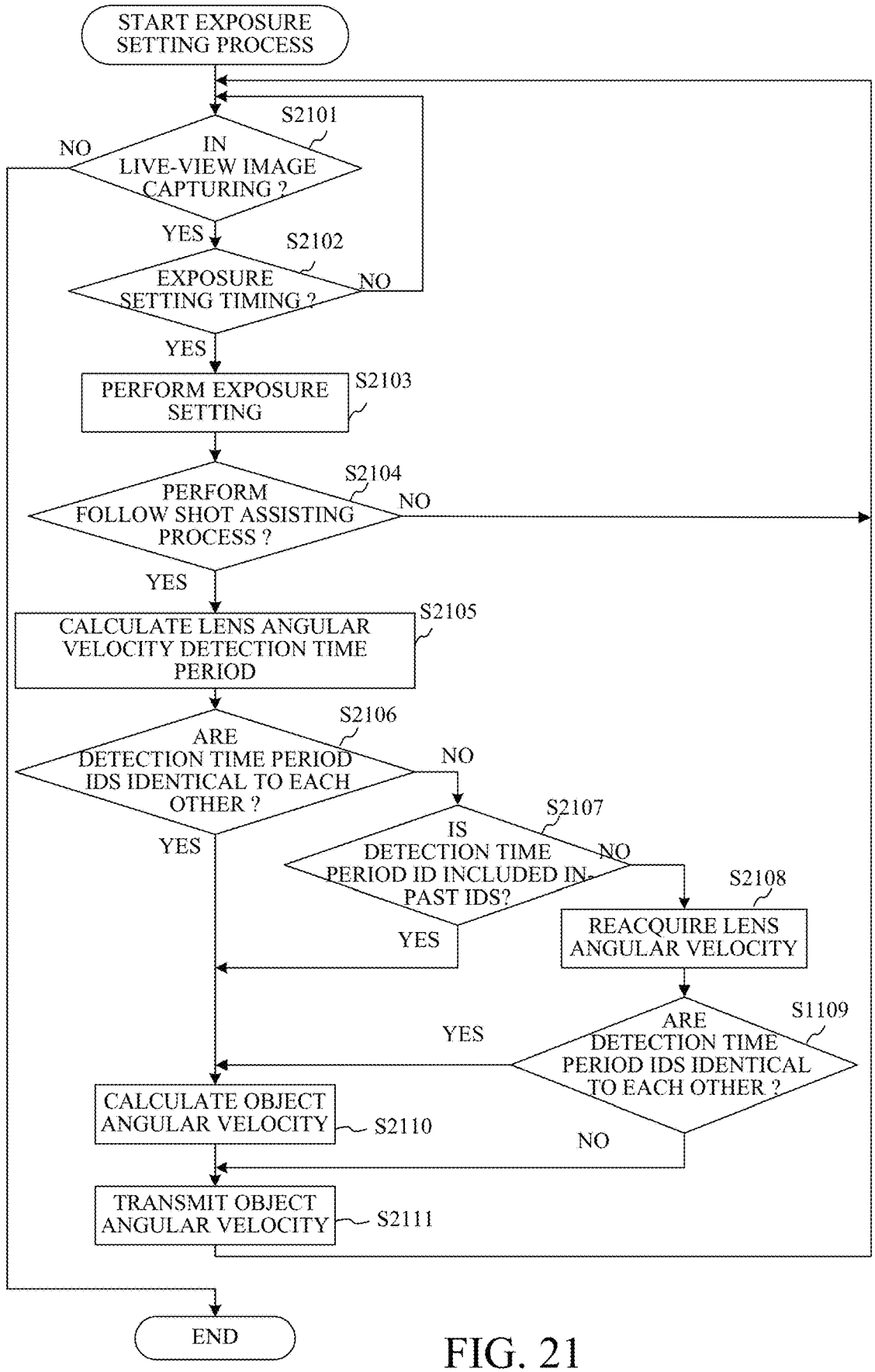
FIG. 21 is a flowchart of an exposure setting process in the camera body of Embodiment 4.

With reference to a flowchart of FIG. 21, description will be made of an exposure setting process performed by the system controller 1130 and the follow shot assist controller 1134 in the camera body 1100 in this embodiment. FIG. 21 illustrates the exposure setting process performed when the camera body 1100 is in the live-view image-capturing mode and the interchangeable lens 1200 attached thereto is compatible with the follow shot assist process. As in Embodiment 3, the exposure setting process is performed for every frame in the live-view image-image capturing mode in order to perform the exposure control for the next frame. Steps S2101 to S2105 in FIG. 21 are common to steps S1301 to S1305 in FIG. 13, and therefore description thereof is omitted.

At step S2106, the follow shot assist controller 1134 determines whether or not the motion vector detection time period ID (that is, the first detection time period ID) corresponding to the motion vector detection time period in which the motion vector to be used is detected is identical to the second detection time period ID corresponding to the lens angular velocity received from the interchangeable lens 1200. If these detection time period IDs are identical to each other, the follow shot assist controller 1134 proceeds to step S2110. If these detection time period IDs are not identical to each other, the follow shot assist controller 1134 proceeds to step S2107.

At step S2107, the follow shot assist controller 1134 determines whether or not multiple second detection time period IDs as past data previously received from the interchangeable lens 1200 include one identical to the motion vector detection time period ID corresponding to the motion vector detection time period in which the motion vector to be used is detected. If the past second detection time period IDs includes the one (hereinafter referred to "a specific past ID") identical to the motion vector detection time period ID, the follow shot assist controller 1134 resets the lens angular velocity corresponding to the specific past ID as a lens angular velocity for calculation and proceeds to step S2110. On the other hand, if the second detection time period IDs do not include the specific past ID, the follow shot assist controller 1134 proceeds to step S2118.

At step S2108, the follow shot assist controller 1134 re-receives, that is, reacquires the lens angular velocity as a second angular velocity with a third detection time period ID (third ID information) from the interchangeable lens 1200.

Next, at step S2109, the follow shot assist controller 1134 determines whether or not the reacquired third detection time period ID reacquired at step S2108 is identical to the motion vector detection time period ID corresponding to the motion vector detection time period in which the motion vector to be used is detected. If these detection time period IDs are identical to each other, the follow shot assist controller 1134 proceeds to step S2110. If these detection time period IDs are not identical to each other, the follow shot assist controller 1134 proceeds to step S2111.

At step S2110, the follow shot assist controller 1134 calculates the object angular velocity using the lens angular velocity and the lens information such as the focal length received from the interchangeable lens 1200 and on the motion vector amount input from the image processor 1140.

As in Embodiment 3, the object angular velocity includes not only the angular velocity but also the angular acceleration rate. The follow shot assist controller 1134 inputs the calculated object angular velocity to the communication controller 1133. As in Embodiment 3, the object angular velocity is provided with the angular velocity acquisition time point corresponding to the lens angular velocity used for calculating the object angular velocity.

At step S2111, the communication controller 1133 performs an object angular velocity communication in order to transmit the object angular velocity with the second detection time period ID to the interchangeable lens 1200 and then returns to step S2101.

The above-described exposure setting process enables the camera body 1100 to perform the exposure control for the next frame and to set the lens angular velocity detection time period to be transmitted in response to a next image-capturing synchronization signal to the interchangeable lens 1200. Furthermore, the exposure setting process enables the camera body 1100 to transmit the object angular velocity to the interchangeable lens 1200 and to receive the lens angular velocity from the interchangeable lens 1200.

As described above, in this embodiment, the communicator (communication controller 1133 and camera I/F 1120) is desirably configured to receive the second angular velocity detected in a different time period from the lens angular velocity detection time period and the third ID information corresponding to the second angular velocity in relation to each other. The calculator (follow shot assist controller 1134) is desirably configured to calculate the object angular velocity when the first ID information and the second ID information are not identical to each other and the first ID information and the third ID information are identical to each other, by using the second angular velocity corresponding to the third ID information. In other words, the calculator is desirably configured to calculate the object angular velocity using the motion vector detected in the first time period corresponding to the first ID information and the second angular velocity corresponding to the third ID information. The second angular velocity corresponding to the third ID information is desirably detected in a time period after the lens angular velocity corresponding to the second ID information is detected.

The calculator is desirably configured to cause the angular velocity detector to reacquire the lens angular velocity as a third angular velocity when the first ID information is not identical to the second ID information and the first ID information is not identical to the third ID information (step S2108). The communicator is desirably configured to receive the reacquired angular velocity and fourth ID information corresponding to the reacquired angular velocity in relation to each other. The calculator is desirably configured to calculate the object angular velocity when the first ID information and the fourth ID information are identical to each other, by using the motion vector detected in the first time period corresponding to the first ID information and the reacquired angular velocity corresponding to the fourth ID information.

The calculator is further desirably configured not to calculate the object angular velocity by using the motion vector detected in the first time period corresponding to the first ID information and the reacquired angular velocity corresponding to the fourth ID information when the first ID information and the fourth ID information are not identical to each other (step S2109).

Also in this embodiment, the camera body 1100 transmits, to the interchangeable lens 1200, the setting value of the lens angular velocity detection time period to which the first detection time period ID is added. Furthermore, the interchangeable lens 1200 transmits the angular velocity detected depending on the setting value of the lens angular velocity detection time period, with the second detection time period ID. This communication enables the camera body 1100 to determine the detection time of the angular velocity, depending on the identity of the first and second detection time period IDs. In addition, the camera body 1100 performs the retry process when the first and second detection time period IDs are not identical to each other. Thereby, this embodiment achieves a lens-interchangeable camera system having a follow shot assist function capable of more accurately calculating the object angular velocity.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., center processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-069915, filed on Mar. 31, 2016 and Japanese Patent Application No. 2016-145210, filed on Jul. 25, 2016, which are hereby incorporated by reference herein in their entirety.

What is claimed is:

1. An image-capturing apparatus to which an accessory apparatus is attachable, the image-capturing apparatus comprising:
an image sensor configured to photoelectrically convert an object image formed through the accessory apparatus, and to output a first image signal; and
at least one processor or circuit configured to execute a plurality of tasks including:

(1) a detecting task configured to perform detection by using (a) the first image signal corresponding to a first timing, and (b) first accessory information received from the accessory apparatus;
(2) a calculating task configured to set, based on the first timing, first time information; and
(3) a communicating task configured to perform communication with the accessory apparatus,
wherein the communicating task is configured to transmit, to the accessory apparatus, (a) the first time information and (b) first ID information corresponding to the first image signal,
wherein the communicating task is configured to receive (a) the first accessory information, which is detected by the accessory apparatus based on the first time information, and (b) second ID information corresponding to a timing when the first accessory information is detected by the accessory apparatus, and
wherein the detecting task is configured to perform the detection, when the first ID information and the second ID information are identical to each other.

2. An image-capturing apparatus according to claim 1, wherein the detecting task is configured not to perform the detection by using the first accessory information, when the first ID information and the second ID information are not identical to each other.

3. An image-capturing apparatus according to claim 2, wherein the first accessory information is angular velocity detected by the accessory apparatus, and
wherein the detecting task is configured to detect angular velocity of the object.

4. An image-capturing apparatus according to claim 1, wherein the communicating task is configured to receive (a) second accessory information detected by the accessory apparatus at a timing different from the timing corresponding to the first time information and (b) third ID information, and
wherein the detecting task is configured to perform the detection by using the first image signal corresponding to the first ID information and the second accessory information corresponding to the third ID information, when the first ID information and the second ID information are not identical to each other and the first ID information and the third ID information are identical to each other.

5. An image-capturing apparatus according to claim 4, wherein the second accessory information corresponding to the third ID information is detected at a timing after the first accessory information corresponding to the second ID information is detected.

6. An image-capturing apparatus according to claim 5, wherein the first accessory information is angular velocity detected by the accessory apparatus, and
wherein the detecting task is configured to detect angular velocity of the object.

7. An image-capturing apparatus according to claim 4, wherein the detecting task is configured to reacquire first accessory information when the first ID information is not identical to the second ID information and the first ID information is not identical to the third ID information,
wherein the communicating task is configured to receive (a) the reacquired first accessory information and (b) fourth ID information, and
wherein the detecting task is configured to perform the detection when the first ID information and the fourth ID information are identical to each other, by using the first image signal corresponding to the first ID information and the reacquired first accessory information corresponding to the fourth ID information.

8. An image-capturing apparatus according to claim 7, wherein the detecting task is configured not to perform the detection by using the first image signal corresponding to the first ID information and the reacquired first accessory information corresponding to the fourth ID information, when the first ID information and the fourth ID information are not identical to each other.

9. An image-capturing apparatus according to claim 8, wherein the first accessory information is angular velocity detected by the accessory apparatus, and
wherein the detecting task is configured to detect angular velocity of the object.

10. An image-capturing apparatus according to claim 7, wherein the first accessory information is angular velocity detected by the accessory apparatus, and
wherein the detecting task is configured to detect angular velocity of the object.

11. An image-capturing apparatus according to claim 4, wherein the first accessory information is angular velocity detected by the accessory apparatus, and
wherein the detecting task is configured to detect angular velocity of the object.

12. An image-capturing apparatus according to claim 1, wherein the first accessory information is angular velocity detected by the accessory apparatus, and
wherein the detecting task is configured to detect angular velocity of the object.

13. An image-capturing apparatus according to claim 12, wherein a detection of the angular velocity of the object is performed using vector information calculated based on the first image signal.

14. An image capturing apparatus according to claim 1, wherein the accessory apparatus is a lens apparatus.

15. An image-capturing apparatus according to claim 1, wherein the communicating task is executed when a follow shot is performed by a user.

16. An image-capturing apparatus according to claim 1, wherein the communicating task receives a same information as the transmitted first ID information as the second ID information.

17. An accessory apparatus attachable to an image-capturing apparatus, the accessory apparatus comprising:
an image-capturing optical system; and
at least one processor or circuit configured to execute a plurality of tasks including:
(1) a communicating task configured to perform communication with the image-capturing apparatus; and
(2) a detecting task configured to detect first accessory information,
wherein the communicating task is configured to receive (a) first time information corresponding to a first timing and (b) first ID information,
wherein the plurality of tasks further comprises a calculating task configured to set a second timing based on the first time information,
wherein the detecting task is configured to detect the first accessory information at a timing corresponding to the second timing, and
wherein the communicating task is configured to transmit, to the image-capturing apparatus, the first accessory information and second ID information corresponding to a first angular velocity in relation to each other, the second ID information being identical to the first ID information.

18. An accessory apparatus according to claim 17, wherein the calculating task is configured to set the second timing based on (a) the first time information and (b) second time information corresponding to a timing of the reception of the first time information and the first ID information.

19. An accessory apparatus according to claim 17, wherein the first accessory information is angular velocity detected by the accessory apparatus.

20. An accessory apparatus according to claim 17, wherein the accessory apparatus is a lens apparatus.

21. An accessory apparatus according to claim 17, wherein the communicating task is executed when a follow shot is performed by a user.

22. An accessory apparatus according to claim 17, wherein the communicating task receives a same information as the transmitted first ID information as the second ID information.

23. A control method of controlling an image-capturing apparatus to which an accessory apparatus is attachable, the control method comprising the steps of:
photoelectrically converting an object image formed through the accessory apparatus to output a first image signal;
performing detection by using (a) the first image signal corresponding to a first timing, and (b) first accessory information received from the accessory apparatus;
setting, based on the first timing, first time information; and
performing communication with the accessory apparatus,
wherein the step of performing communication transmits, to the accessory apparatus, (a) the first time information and (b) first ID information corresponding to the first image signal,
wherein the step of performing communication receives (a) the first accessory information, which is detected by the accessory apparatus based on the first time information and (b) second ID information corresponding to a timing when the first accessory information is detected by the accessory apparatus, and
wherein the detection is performed when the first ID information and the second ID information are identical to each other.

24. A control method of an accessory apparatus that is attachable to an image-capturing apparatus, and that includes an image-capturing optical system, the control method comprising the steps of:
receiving (a) first time information corresponding to a first timing and (b) first ID information;
setting a second timing based on the first time information;
detecting first accessory information at a timing corresponding to the second timing; and
transmitting, to the image-capturing apparatus, (a) the first accessory information and (b) second ID information corresponding to a first angular velocity in relation to each other, the second ID information being identical to the first ID information.

* * * * *